US008054527B2

(12) United States Patent
Khazeni et al.

(10) Patent No.: US 8,054,527 B2
(45) Date of Patent: Nov. 8, 2011

(54) ADJUSTABLY TRANSMISSIVE MEMS-BASED DEVICES

(75) Inventors: Kasra Khazeni, San Jose, CA (US);
Manish Kothari, Cupertino, CA (US);
Marc Mignard, San Jose, CA (US);
Gang Xu, Cupertino, CA (US); Russell W. Gruhlke, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/255,423

(22) Filed: Oct. 21, 2008

(65) Prior Publication Data
US 2009/0103166 A1     Apr. 23, 2009

Related U.S. Application Data

(60) Provisional application No. 60/982,094, filed on Oct. 23, 2007.

(51) Int. Cl.
*G02B 26/00* (2006.01)
(52) U.S. Cl. ........ 359/290; 359/224; 359/291; 359/292; 359/295; 359/298; 359/318
(58) Field of Classification Search .................. 359/223, 359/224, 290–292, 295, 298, 318
See application file for complete search history.

(56) References Cited

U.S. PATENT DOCUMENTS

| | | |
|---|---|---|
| 2,590,906 A | 4/1952 | Tripp |
| 2,677,714 A | 5/1954 | Auwarter |
| 3,247,392 A | 4/1966 | Thelen |
| 3,679,313 A | 7/1972 | Rosenberg |
| 3,728,030 A | 4/1973 | Hawes |
| 3,886,310 A | 5/1975 | Guldberg |
| 3,955,190 A | 5/1976 | Teraishi |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,779,959 A | 10/1988 | Saunders |

(Continued)

FOREIGN PATENT DOCUMENTS

DE    10 2006 039 071    2/2008

(Continued)

OTHER PUBLICATIONS

Conner, "Hybrid Color Display Using Optical Interference Filter Array," SID Digest, pp. 577-580 (1993).

(Continued)

*Primary Examiner* — Evelyn A. Lester
(74) *Attorney, Agent, or Firm* — Knobbe, Martens, Olson & Bear LLP

(57) ABSTRACT

Modulator devices are selectably adjustable between at least two states, wherein the transmission and/or reflection of particular wavelengths of light are modified. Certain modulator devices are substantially uniformly adjustable over a wide range of wavelengths, including visible and infrared wavelengths. Other modulator devices are adjustable over visible wavelengths without significantly affecting infrared wavelengths. In addition, the modulator devices may be used in conjunction with fixed thin film reflective structures.

24 Claims, 25 Drawing Sheets

U.S. PATENT DOCUMENTS

| | | |
|---|---|---|
| 4,786,128 A | 11/1988 | Birnbach |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zahowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | Van Wijk |
| 5,452,138 A | 9/1995 | Mignardi et al. |
| 5,471,341 A | 11/1995 | Warde et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeiyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goosen |
| 5,719,068 A | 2/1998 | Suzawa et al. |
| 5,734,177 A | 3/1998 | Sakamoto |
| 5,771,116 A | 6/1998 | Miller et al. |
| 5,786,927 A | 7/1998 | Greywall et al. |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen et al. |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 5,986,796 A | 11/1999 | Miles |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,242,932 B1 | 6/2001 | Hembree |
| 6,262,697 B1 | 7/2001 | Stephenson |
| 6,301,000 B1 | 10/2001 | Johnson |
| 6,327,071 B1 | 12/2001 | Kimura |
| 6,335,235 B1 | 1/2002 | Bhekta et al. |
| 6,351,329 B1 | 2/2002 | Greywall |
| 6,356,378 B1 | 3/2002 | Huibers |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,738,194 B1 | 5/2004 | Ramirez et al. |
| 6,768,555 B2 | 7/2004 | Lin et al. |
| 6,794,119 B2 | 9/2004 | Miles |
| 6,813,059 B2 | 11/2004 | Hunter et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,980,350 B2 | 12/2005 | Hung et al. |
| 6,982,820 B2 | 1/2006 | Tsai |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,289,259 B2 | 10/2007 | Chui et al. |
| 7,302,157 B2 | 11/2007 | Chui |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,417,746 B2 | 8/2008 | Lin et al. |
| 7,420,725 B2 | 9/2008 | Kothari |
| 7,436,573 B2 | 10/2008 | Doan et al. |
| 7,459,402 B2 | 12/2008 | Doan et al. |
| 7,460,291 B2 | 12/2008 | Sampsell et al. |
| 7,460,292 B2 | 12/2008 | Chou |
| 7,476,327 B2 | 1/2009 | Tung et al. |
| 7,492,503 B2 | 2/2009 | Chui |
| 7,508,566 B2 | 3/2009 | Feenstra et al. |
| 7,535,621 B2 | 5/2009 | Chiang |
| 7,566,664 B2 | 7/2009 | Yan et al. |
| 7,567,373 B2 | 7/2009 | Chui et al. |
| 7,569,488 B2 | 8/2009 | Rafanan |
| 7,629,197 B2 | 12/2009 | Luo et al. |
| 7,746,529 B2 * | 6/2010 | Hagood et al. ................ 359/233 |
| 7,782,523 B2 | 8/2010 | Ishii |
| 7,813,029 B2 | 10/2010 | Kothari et al. |
| 7,848,003 B2 | 12/2010 | Kothari et al. |
| 7,852,544 B2 | 12/2010 | Sampsell |
| 7,855,826 B2 | 12/2010 | de Groot |
| 7,898,722 B2 | 3/2011 | Miles |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |

| | | |
|---|---|---|
| 2002/0149828 A1 | 10/2002 | Miles |
| 2002/0149834 A1 | 10/2002 | Mei et al. |
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0240032 A1 | 12/2004 | Miles |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0079048 A1 | 4/2006 | Sampsell |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0262126 A1 | 11/2006 | Miles |
| 2006/0262380 A1 | 11/2006 | Miles |
| 2006/0268388 A1 | 11/2006 | Miles |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0153860 A1 | 7/2007 | Chang-Hasnain et al. |
| 2007/0177247 A1 | 8/2007 | Miles |
| 2007/0194630 A1 | 8/2007 | Mingard et al. |
| 2007/0216987 A1 | 9/2007 | Hagood et al. |
| 2007/0253054 A1 | 11/2007 | Miles |
| 2007/0279729 A1 | 12/2007 | Kothari et al. |
| 2007/0285761 A1 | 12/2007 | Zhong et al. |
| 2008/0002299 A1 | 1/2008 | Thurn |
| 2008/0013144 A1 | 1/2008 | Chui et al. |
| 2008/0013145 A1 | 1/2008 | Chui et al. |
| 2008/0030657 A1 | 2/2008 | Wu et al. |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0068697 A1 | 3/2008 | Haluzak et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0186581 A1 | 8/2008 | Bita et al. |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0297880 A1 | 12/2008 | Steckl et al. |
| 2008/0316566 A1 | 12/2008 | Lan |
| 2008/0316568 A1 | 12/2008 | Griffiths et al. |
| 2009/0009845 A1 | 1/2009 | Endisch et al. |
| 2009/0068781 A1 | 3/2009 | Tung et al. |
| 2009/0073534 A1 | 3/2009 | Lee et al. |
| 2009/0073539 A1 | 3/2009 | Mignard |
| 2009/0078316 A1 | 3/2009 | Khazeni |
| 2009/0080060 A1 | 3/2009 | Sampsell et al. |
| 2009/0101192 A1 | 4/2009 | Kothari et al. |
| 2009/0135465 A1 | 5/2009 | Chui |
| 2009/0201566 A1 | 8/2009 | Kothari |
| 2009/0213450 A1 | 8/2009 | Sampsell |
| 2009/0213451 A1 | 8/2009 | Tung et al. |
| 2009/0256218 A1 | 10/2009 | Mignard et al. |
| 2009/0273823 A1 | 11/2009 | Tung et al. |
| 2009/0273824 A1 | 11/2009 | Sasagawa |
| 2009/0279162 A1 | 11/2009 | Chui |
| 2010/0039370 A1 | 2/2010 | Miles |
| 2010/0080890 A1 | 4/2010 | Tung et al. |
| 2010/0085626 A1 | 4/2010 | Tung et al. |
| 2010/0118382 A1 | 5/2010 | Kothari et al. |
| 2010/0236624 A1 | 9/2010 | Khazeni et al. |
| 2010/0309572 A1 | 12/2010 | Mignard |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0044496 A1 | 2/2011 | Chui et al. |

FOREIGN PATENT DOCUMENTS

| | | |
|---|---|---|
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |

| | | |
|---|---|---|
| EP | 1 473 581 | 11/2004 |
| EP | 1 640 762 | 3/2006 |
| EP | 1 928 028 | 6/2008 |
| JP | 56-088111 | 7/1981 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| WO | WO 98/14804 | 4/1998 |
| WO | WO 02/24570 | 3/2002 |
| WO | WO 02/086582 | 10/2002 |
| WO | WO 03/105198 | 12/2003 |
| WO | WO 2006/035698 | 4/2006 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |

OTHER PUBLICATIONS

Feenstra et al., Electrowetting displays, Liquivista BV, 16 pp., Jan. 2006.
Jerman et al., "A Miniature Fabry-Perot Interferometer with a Corrugated Silicon Diaphragm Support", (1988).
Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.
Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.
Lezec, Submicrometer dimple array based interference color field displays and sensors, Nano Lett. 7(2):329-333, Dec. 23, 2006.
Miles, A New Reflective FPD Technology Using Interferometric Modulation, Journal of the SID, 5/4, 1997.
Miles, Interferometric modulation: MOEMS as an enabling technology for high performance reflective displays, Proceedings of SPIE, vol. 4985, pp. 131-139, 2003.
Pape et al., Characteristics of the deformable mirror device for optical information processing, Optical Engineering, 22(6):676-681, Nov.-Dec. 1983.
Taii et al., "A transparent sheet display by plastic MEMS," Journal of the SID 14(8):735-741, 2006.
Invitation to Pay Additional Fees including Annex to Form PCT/ISA/206—Communication Relating to the Results of the Partial International Search cited in corresponding application PCT/US2008/080651 dated Feb. 9, 2009 in 4 pages.
ISR and WO dated Apr. 7, 2009 for PCT/US08/080651.
Longhurst, 1963, Chapter IX: Multiple Beam Interferometry, in Geometrical and Physical Optics, pp. 153-157.
Tolansky, 1948, Chapter II: Multiple-Beam Interference, in Multiple-bean Interferometry of Surfaces and Films, Oxford at the Clarendon Press, pp. 8-11.
IPRP dated May 6, 2010 for PCT/US08/080651.
Londergan et al., Advanced processes for MEMS-based displays, Proceedings of the Asia Display 2007, SID, 1:107-112.
Nakagawa et al., Feb. 1, 2002, Wide-field-of-view narrow-band spectral filters based on photonic crystal nanocavities, Optics Letters, 27(3):191-193.
Billard, Tunable Capacitor, 5th Annual Review of LETI, Jun. 24, 2003, p. 7.
Hohlfeld et al., Jun. 2003, Micro-machined tunable optical filters with optimized band-pass spectrum, 12th International Conference on Transducers, Solid-State Sensors, Actuators and Microsystems, 2:1494-1497.
Mehregany et al., 1996, MEMS applications in optical systems, IEEE/LEOS 1996 Summer Topical Meetings, pp. 75-76.
Miles et al, Oct. 21, 1997, A MEMS based interferometric modulator (IMOD) for display applications, Proceedings of Sensors Expo, pp. 281-284.
Nieminen et al., 2004, Design of a temperature-stable RF MEM capacitor, IEEE Journal of Microelectromechanical Systems, 13(5):705-714.
Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

* cited by examiner

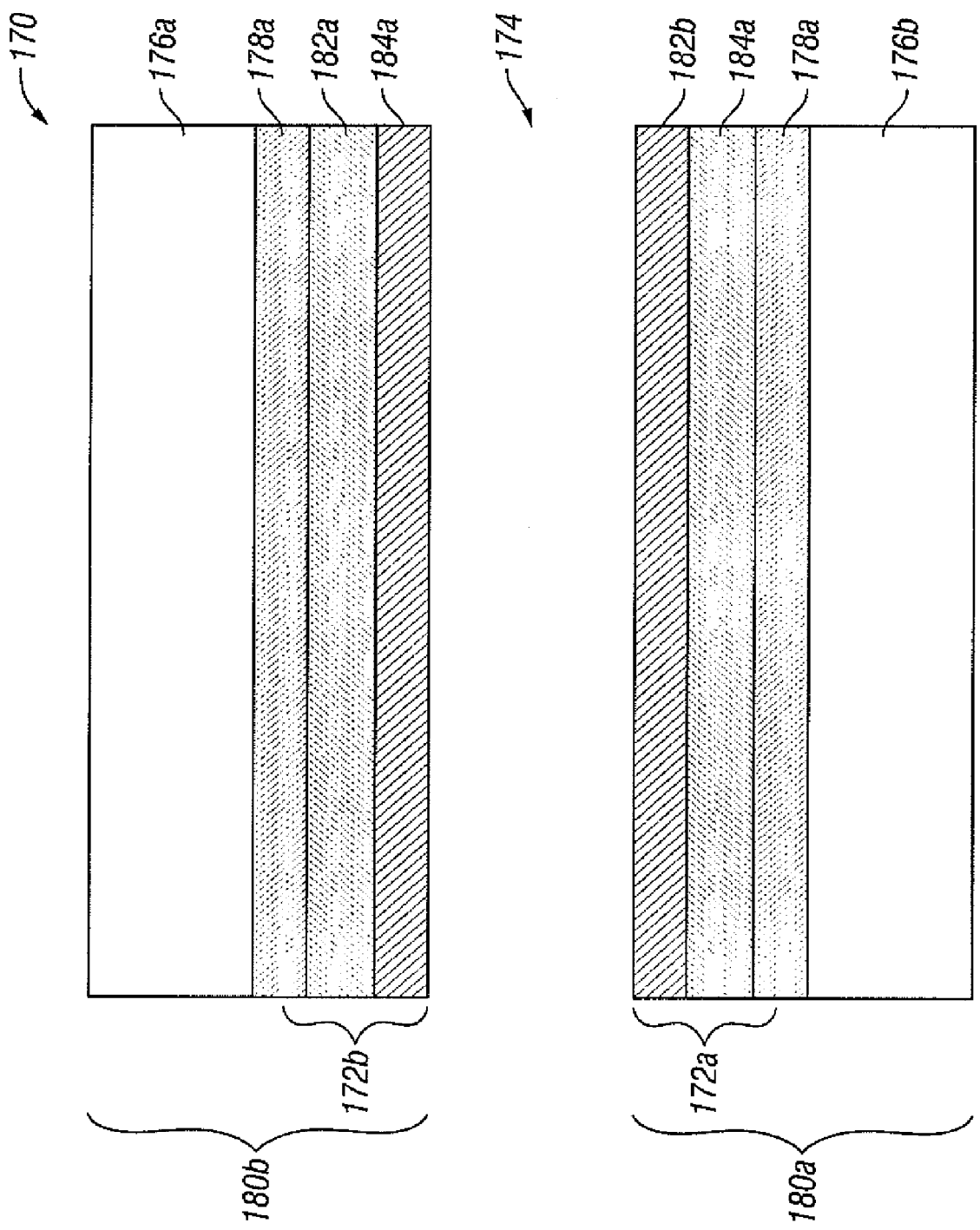

ADJUSTABLY TRANSMISSIVE MEMS-BASED DEVICES

CROSS-REFERENCE TO RELATED APPLICATIONS

The present application claims priority to U.S. Provisional Application No. 60/982,094, filed Oct. 23, 2007, the disclosure of which is hereby incorporated by reference in its entirety.

FIELD OF THE INVENTION

The present invention relates to microelectromechanical systems (MEMS).

DESCRIPTION OF THE RELATED ART

MEMS include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

In one aspect, a MEMS device includes a first film stack disposed upon a substrate, and a second film stack spaced apart from the first film stack by a gap, where the second film stack is movable between a first position and a second position, where the MEMS device transmits substantially more visible light in the first position than in the second position, and where the MEMS device transmits substantially the same amount of infrared light when the MEMS device is in the first position as in the second position.

In another aspect, a MEMS device includes a first film stack disposed upon a substrate, and a second film stack spaced apart from the first film stack by an air gap, where the second film stack is movable between a first position and a second position, where the MEMS device transmits substantially more visible light and infrared light when in the first position than is transmitted in the second position.

In another aspect, a glass pane includes a first glass layer, a second glass layer sealed to the first glass layer to define a cavity therebetween, a MEMS device disposed on a surface of the first glass layer facing the second glass layer, the MEMS device including a layer movable between a first position where the amount of infrared radiation transmitted through the MEMS device is dependent upon the position of the movable layer.

In another aspect, a MEMS device includes a first composite layer disposed upon a substrate, the first composite layer including: a first conductive layer, and a first optical layer, a second composite layer separated from the first composite layer via an air gap, where the second composite layer is movable toward the first composite layer, the second composite layer including: a second conductive layer, and a second optical layer, where displacement of the second composite layer towards the first composite layer alters the transmission of infrared light through the MEMS device.

In another aspect, a MEMS system includes a transparent substrate, a MEMS device disposed on or adjacent the transparent substrate, the MEMS device including a layer movable between a first position where the device is switchable between a first state which is substantially transmissive to incident light, and a second state in which the reflection of incident light is increased, a sensor configured to sense incident light in a location proximate the substrate, and control circuitry in electrical communication with the sensor, where the control circuitry controls the state of the MEMS device based at least in part upon the state of the sensor.

BRIEF DESCRIPTION OF THE DRAWINGS

FIG. 12A is a schematic cross-section of an embodiment of an electrostatically actuatable modulator device comprising a pair of dielectric mirrors.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

While a fixed thin film stack used to modify the transmission of particular wavelengths of light may be suitable for certain applications, a MEMS-based modulator device which comprises thin films spaced apart from each other by an air (or other gas or fluid) gap permits active management of the transmissive or reflective properties by switching between two or more states. For example, a window which is highly reflective to infrared radiation from the sun may be desirable during hot summer months, but less desirable during winter months or at night. By providing a modulator device in place of a fixed thin film stack, the window can be adjusted to be less reflective to incident infrared light when desired. Similarly, the transmission or reflection of visible light may be modified as well, so as to provide, for example, privacy glass which can be easily switched to a highly transmissive state, which may be used in lieu of or in conjunction with drapes or blinds in a dwelling. In some embodiments, multiple such devices can be utilized to provide the desired transmissive and reflective properties, including the use of fixed thin film stacks in conjunction with movable modulator devices.

Figure 1:
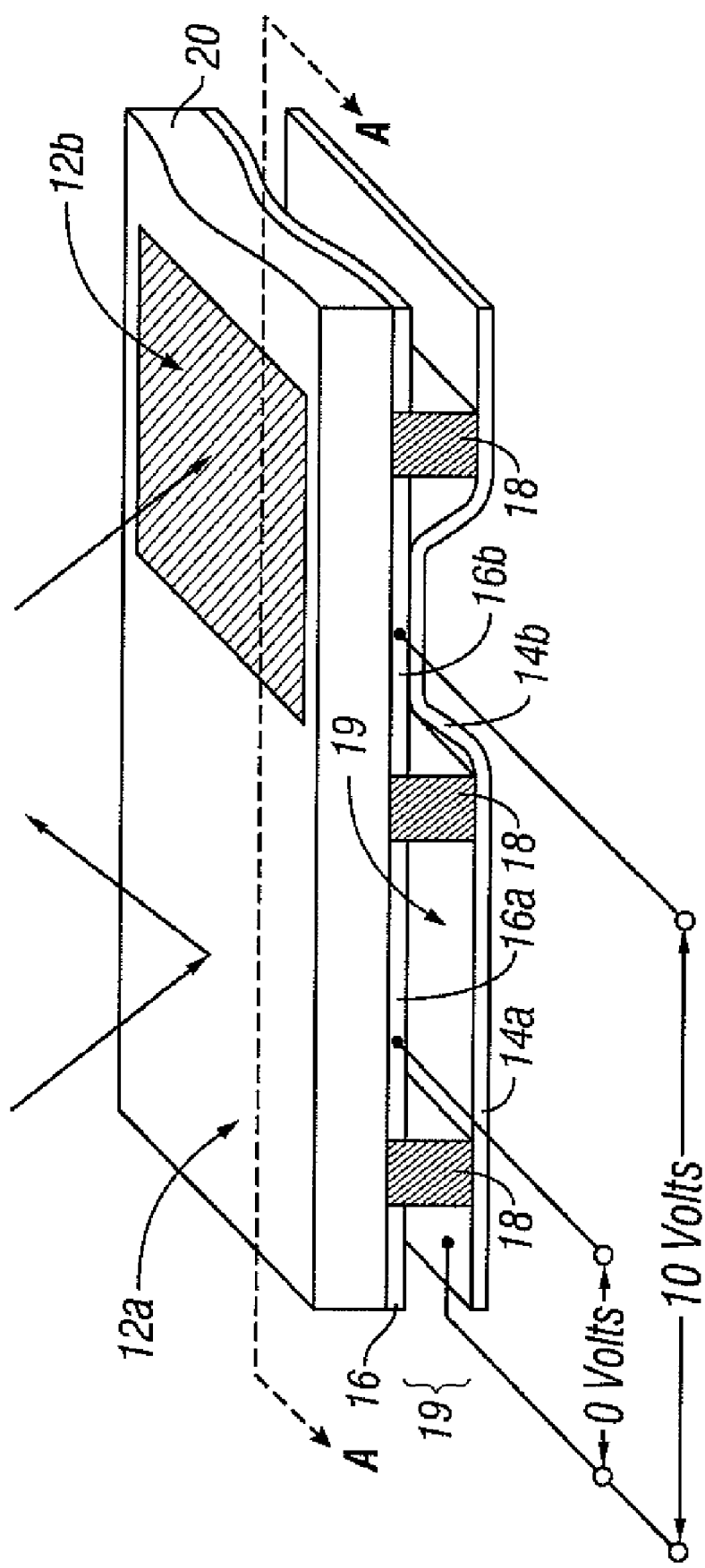
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap ("air gap" or simply "gap") with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
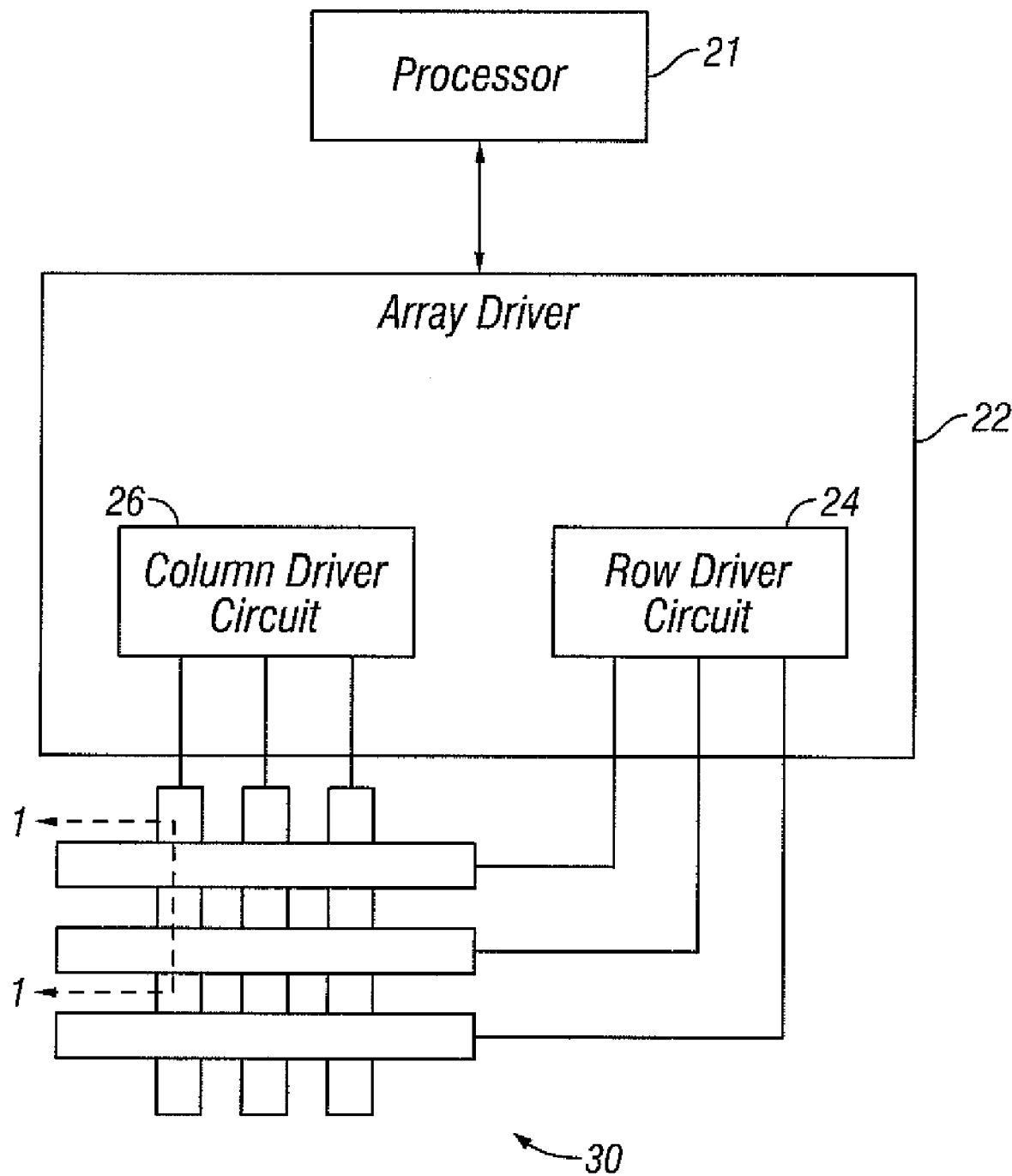
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse.

This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
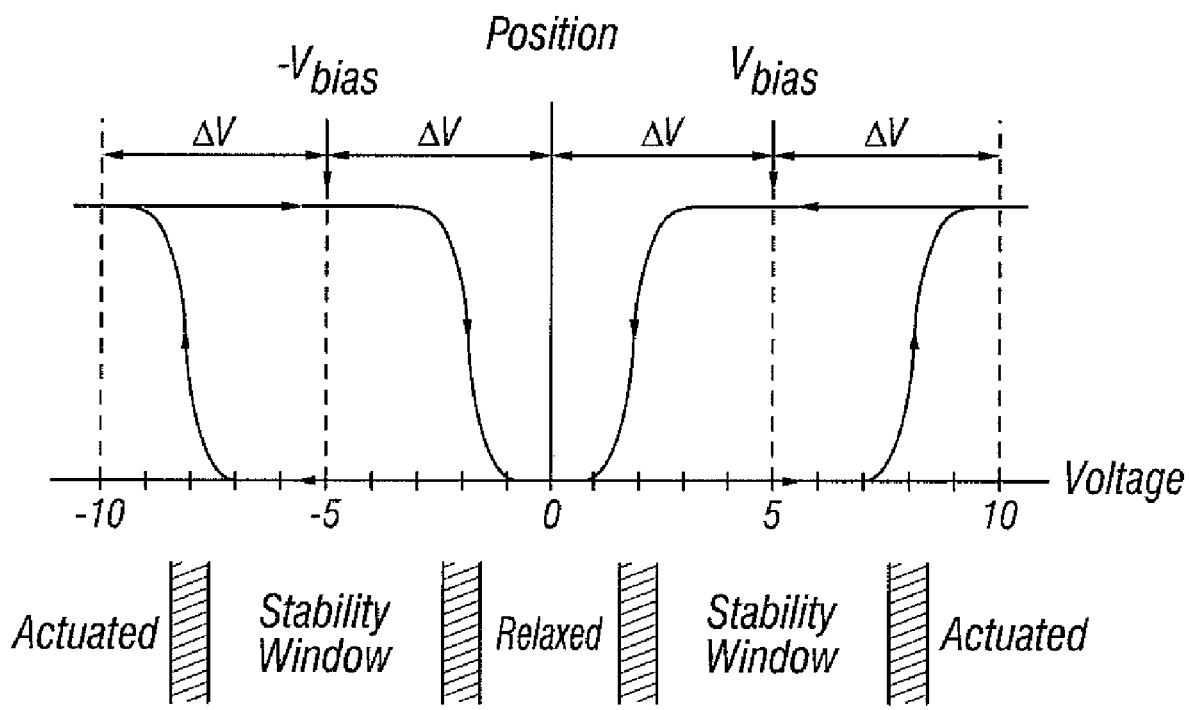
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
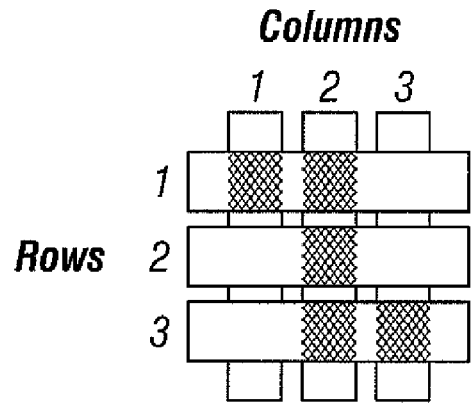
FIG. 5A illustrates one exemplary frame of display data in the 3×3 interferometric modulator display of FIG. 2.
Figure 5B:
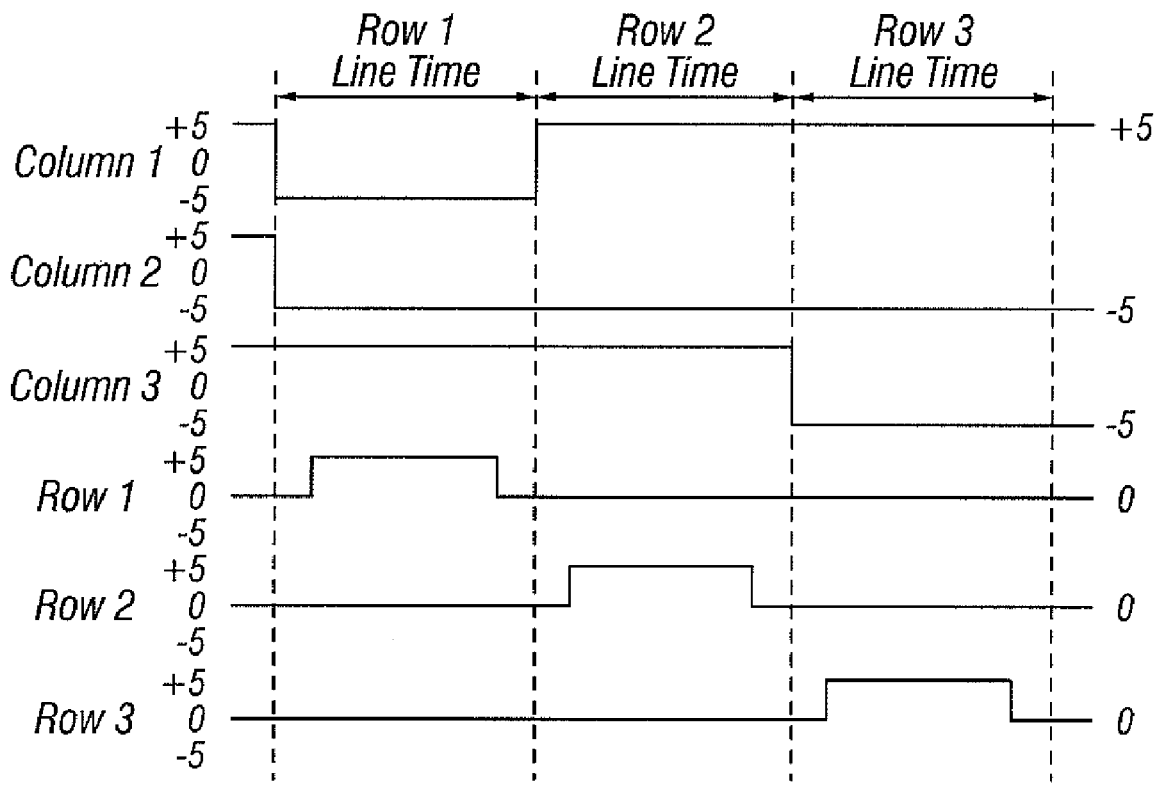
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate 5 column to $-V_{bias}$, and the appropriate row to $+\Delta V$, which may correspond to $-5$ volts and $+5$ volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
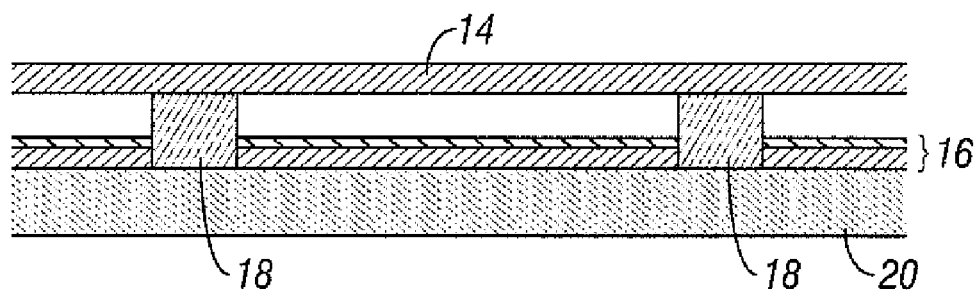
FIG. 6A is a cross section of the device of FIG. 1.
Figure 6B:
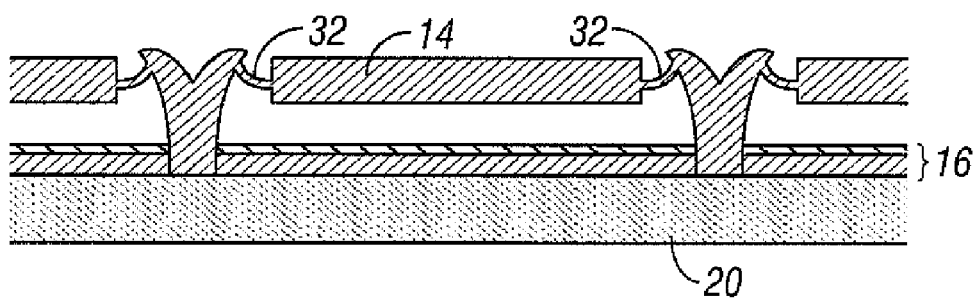
FIG. 6B is a cross section of an alternative embodiment of an interferometric modulator.
Figure 6C:
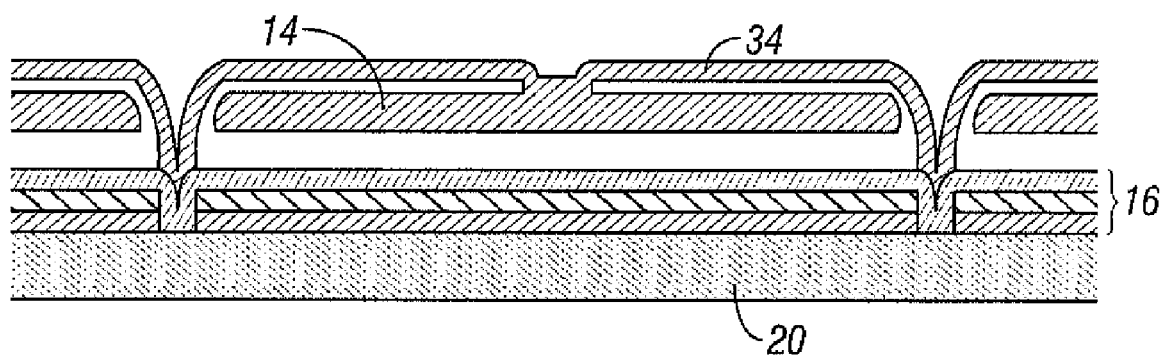
FIG. 6C is a cross section of another alternative embodiment of an interferometric modulator.
Figure 6D:
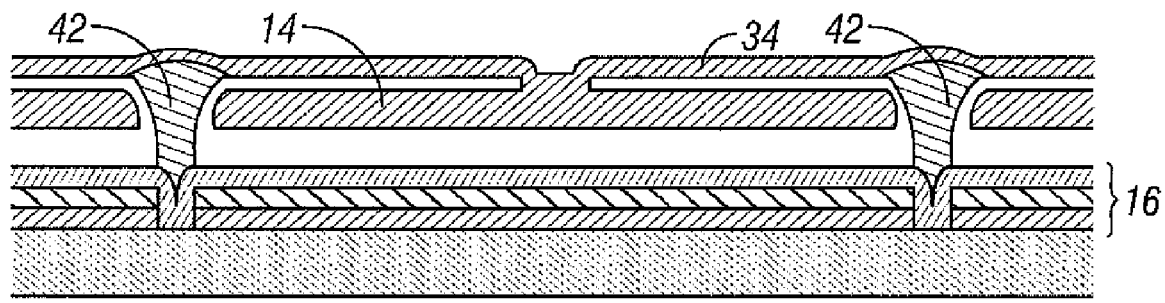
FIG. 6D is a cross section of yet another alternative embodiment of an interferometric modulator.
Figure 6E:
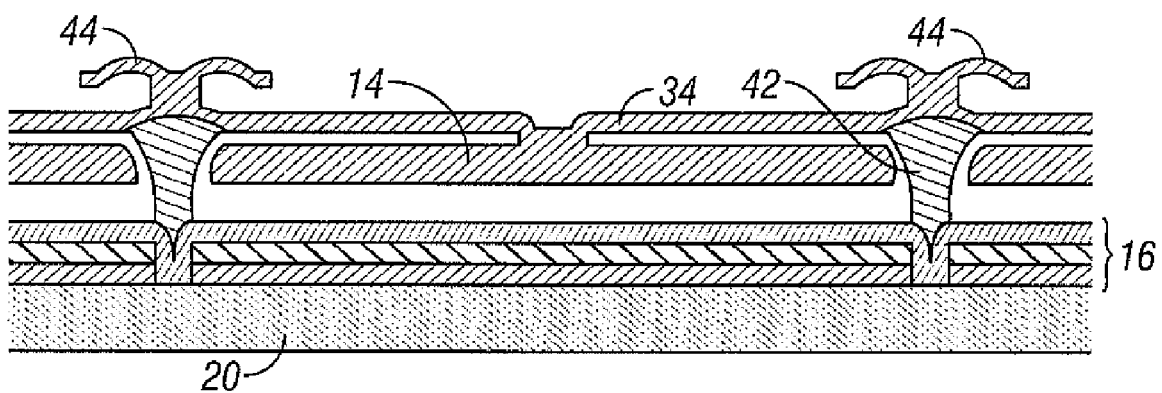
FIG. 6E is a cross section of an additional alternative embodiment of an interferometric modulator.

The details of the structure of interferometric modulators that operate in accordance with the principles set forth above may vary widely. For example, FIGS. 6A-6E illustrate five different embodiments of the movable reflective layer 14 and its supporting structures. FIG. 6A is a cross section of the embodiment of FIG. 1, where a strip of metal material 14 is deposited on orthogonally extending supports 18. In FIG. 6B, the moveable reflective layer 14 is attached to supports at the corners only, on tethers 32. In FIG. 6C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 6D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 6E is based on the embodiment shown in FIG. 6D, but may also be adapted to work with any of the embodiments illustrated in FIGS. 7A-7C, as well as additional embodiments not shown. In the embodiment shown in FIG. 6E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 6, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 6E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 6C-6E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Conventional double pane windows can be modified to utilize the interferometric properties of fixed thin film stacks to alter the reflective properties of the windows. This may be used, for example, to reflect incident sunlight in warmer climates so as to maintain a cooler environment inside a dwelling. The U.S. Department of Energy estimates that windows contribute to 30% of the heating and cooling energy spent worldwide, in order to maintain buildings at a desired temperatures. In the United States, this amounts to roughly 30 billion dollars annually, and accounts for roughly 30% of the carbon dioxide emissions generated by electrical power plants. In vehicles, the additional fuel consumed in a car when the air conditioning is on can be as much as 30%.

Because roughly 50% of the radiant heat from sunlight transmitted through a window is in the form of visible light, and roughly 50% is in the form of infrared light, a reduction in the amount of infrared light transmitted through a window can result in a significant reduction in the amount of heat transfer into the dwelling. Therefore for example, a thin film stack may be provided in double pane windows to interferometrically reflect undesired infrared light without significantly altering the transmission of visible light. In windows for use in other climates, the reflectance of the windows may be optimized for the particular climate. For example in cold climates, radiant heat can be reflected back into the dwelling via low-emissivity coatings (low-e coatings) so as to retain heat during the winter months, and/or the infrared portion of sunlight can be transmitted into the dwelling to add heat to the dwelling.

However, the use of only a fixed thin film stack does not permit adjustment of transmissive and reflective properties to optimally address diverse heating and lighting situations. Although high reflectance of solar infrared radiation may be desirable during the summer in warmer climates, such high reflectance may be less desirable during the winter months or even at night. Furthermore, as such windows typically have a high transmissivity to visible light, no reduction in the amount of heat transmitted via visible light is possible. In certain embodiments, windows comprising a movable layer may be utilized to selectively alter the transmissivity and/or reflectivity of the window when desired. Although a window might not have constant high reflection of visible light, control over the amount of light reflected by a window permits the reflection of visible light when desired while permitting transmission of visible light at other times.

In addition, particular wavelength ranges within the infrared and visible light ranges may be of interest. For example, thermal infrared having a wavelength of 10-20 microns may be reflected so as to keep heat inside a house or vehicle during the winter months or at night. Near IR having a wavelength of less than 1500 nm may be reflected as discussed above so as to reduce the amount of heat transmission from incident sunlight. Most midrange IR having wavelengths between 1.5 and 10 microns is typically absorbed by carbon dioxide and water vapor in the atmosphere, but in certain embodiments a modulator device may be configured to reflect such wavelengths, as well. Therefore, in some embodiments, the transmissive and/or reflective characteristics can be selected or tuned in a wavelength-dependent manner. For example in some embodiments, while infrared energy is selectively reflected, visible light may be transmitted with little change.

Figure 7A:
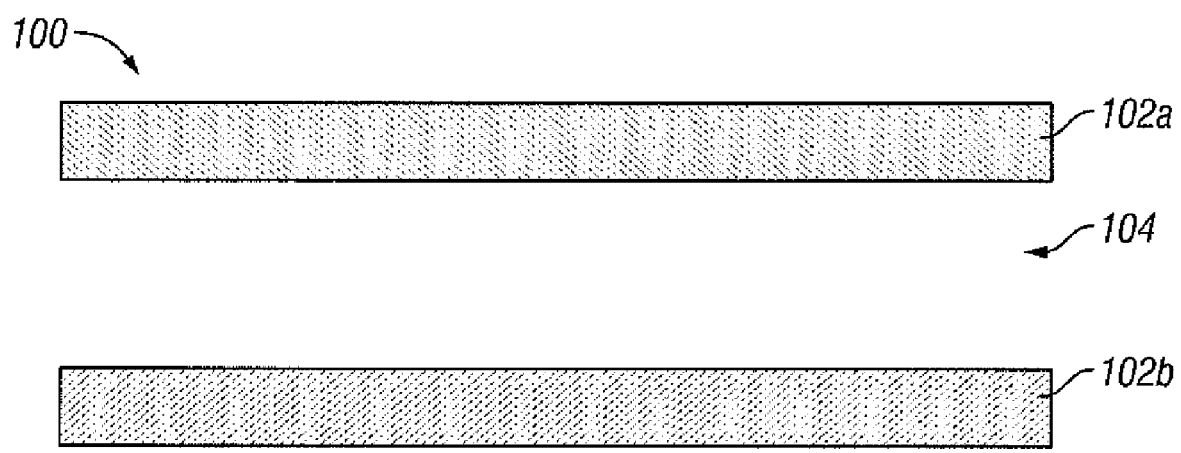
FIG. 7A is a schematic cross-section of a modulator device capable of switching between a highly transmissive state and a highly reflective state.
Figure 7B:
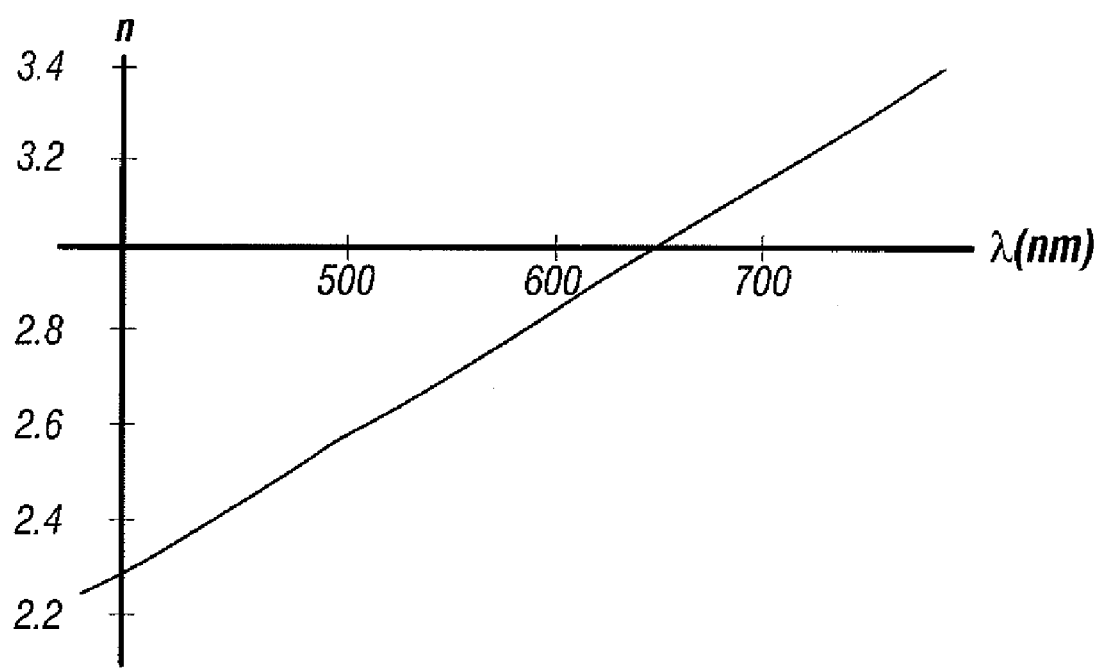
FIG. 7B is a plot of the index of refraction of an ideal theoretical material used in the modulator device of FIG. 7A as a function of wavelength.

The refractive index of a material may vary as a function of wavelength. Thus, for light incident at an angle upon an interferometric modulator, the effective optical path may vary for different wavelengths of light, depending on the materials used in the optical stack and the movable layer. FIG. 7A illustrates a simplified modulator device 100 having two layers 102a and 102b movable relative to one another and separated by an air gap 104. Note that in FIG. 7A and FIGS. 8A, 9A, 10A, 11A, and 12A, features such as posts 18 (shown in FIG. 6A) that separate the layers 102a and 102b are not shown for the sake of clarity. Further, other structures such as shown in FIGS. 1-6E are omitted for the sake of clarity, although such features may be included in the device. FIG. 7B illustrates the refractive index versus wavelength $\lambda$ (in nm) of an ideal theoretical material having a refractive index which varies linearly based on wavelength. Such a material can be used to create a simulated modulator device which is highly transmissive for a first air gap height and highly reflective for a second air gap height, due to the variance in the index of refraction as a function of wavelength seen in FIG. 7B.

Figure 7C:
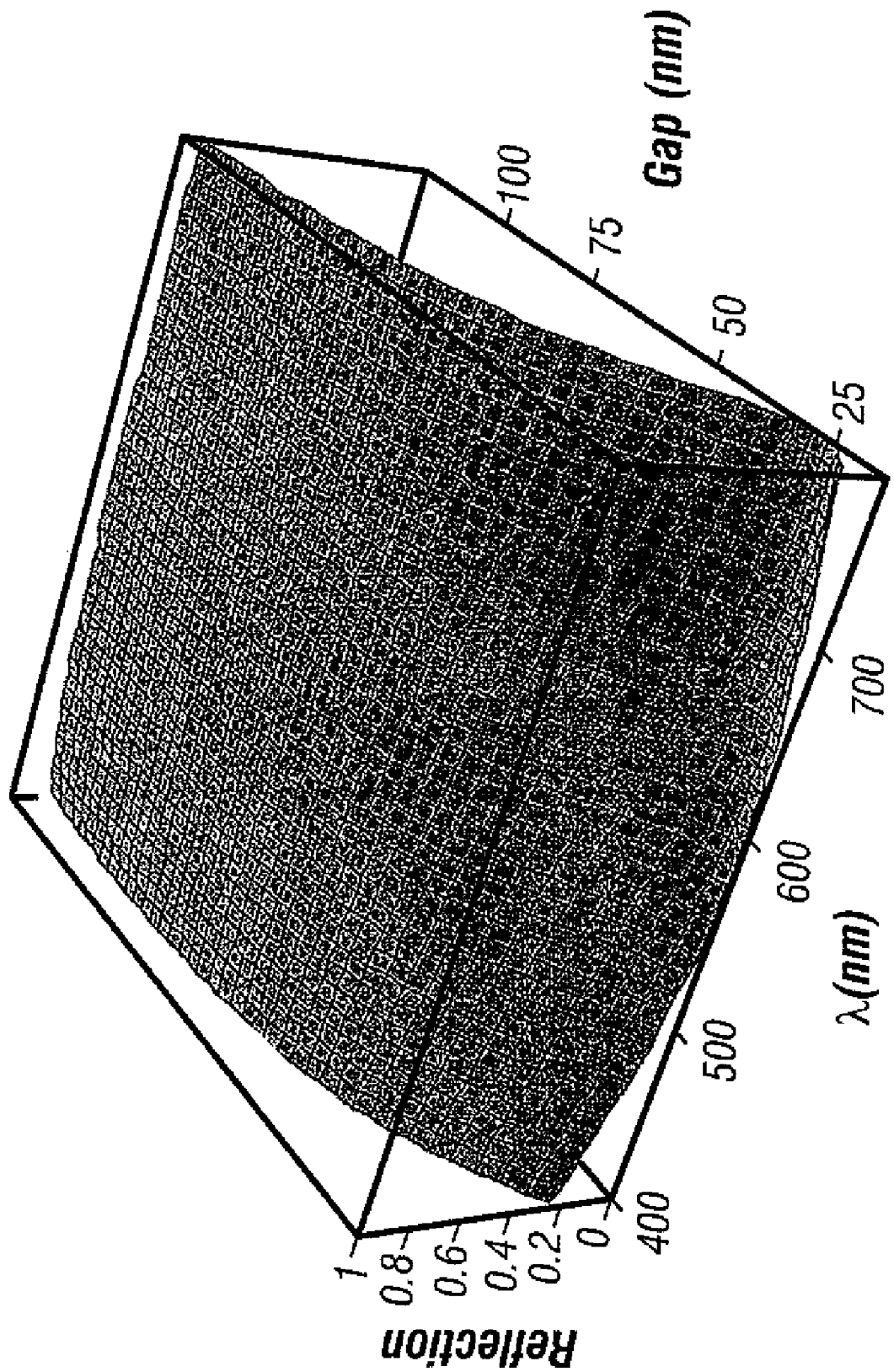
FIG. 7C is a plot of the reflection of the modulator device of FIG. 8A as a function of wavelength and air gap height.

For a simulated device in which the layers 100a and 100b are formed from the theoretical material of FIG. 7B, and have thicknesses of roughly 43 nm, their predicted reflection as a function of wavelength $\lambda$ (in nm) and the size of the air gap (in nm) 104 is shown in FIG. 7C. Similarly, the transmission as a function of wavelength $\lambda$ (in nm) and air gap 104 size (in nm) can be seen in FIG. 7D. Such a simulated device using the theoretical material could thus move from being highly transmissive to highly reflective across a broad wavelength range.

Figure 7D:
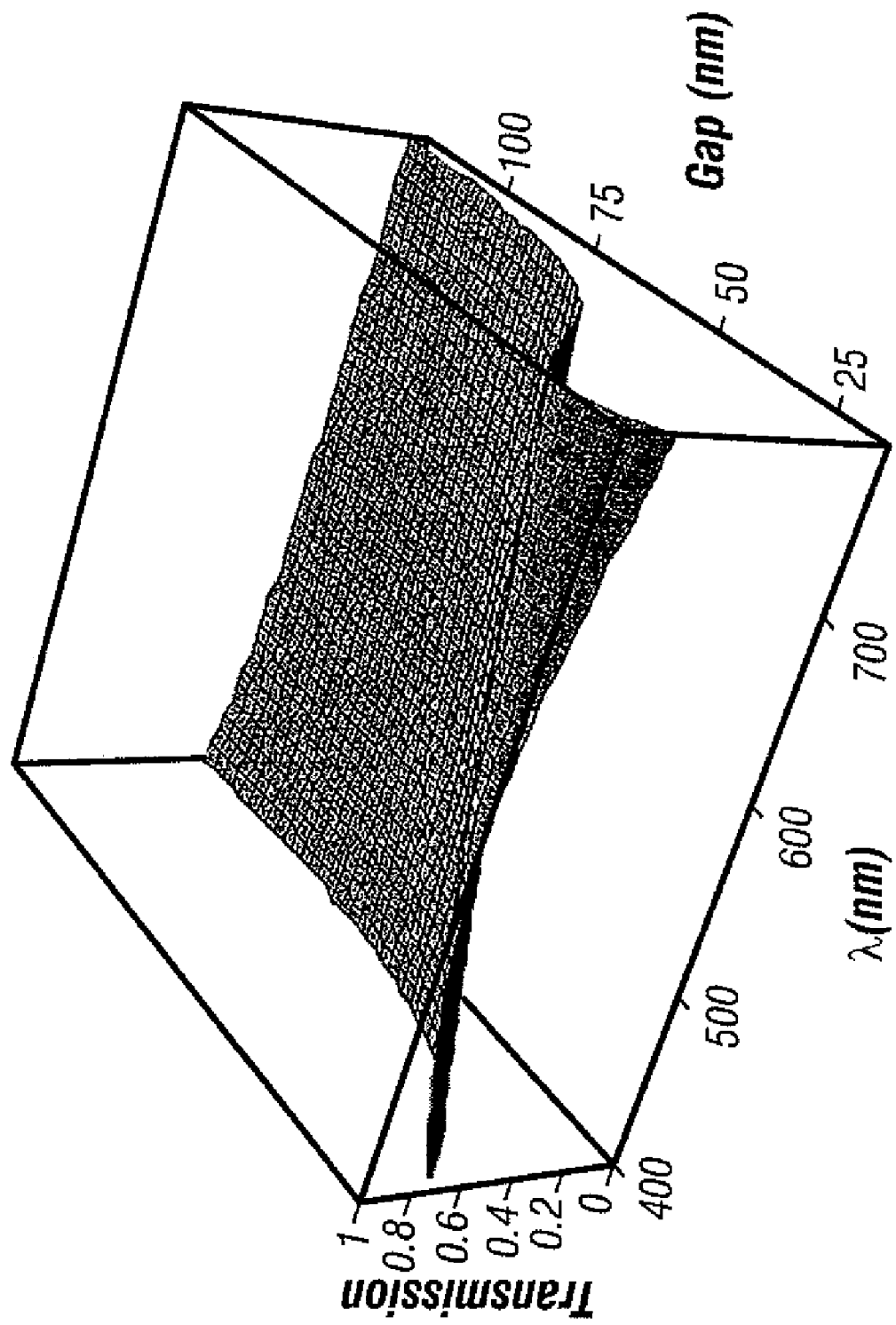
FIG. 7D is a plot of the transmission of the modulator device of FIG. 8A as a function of wavelength and air gap height.

The predicted plots of transmission and reflection in FIGS. 7C and 7D, as well as the ones shown elsewhere in the application, are based upon optical models of the described system, taking into account the specific materials and thicknesses, as well as the optical properties of those materials, such as the index of refraction.

Figure 8A:
FIG. 8A is a schematic cross-section of another embodiment of a modulator device capable of switching between a highly transmissive state and a highly reflective state.
Figure 8B:
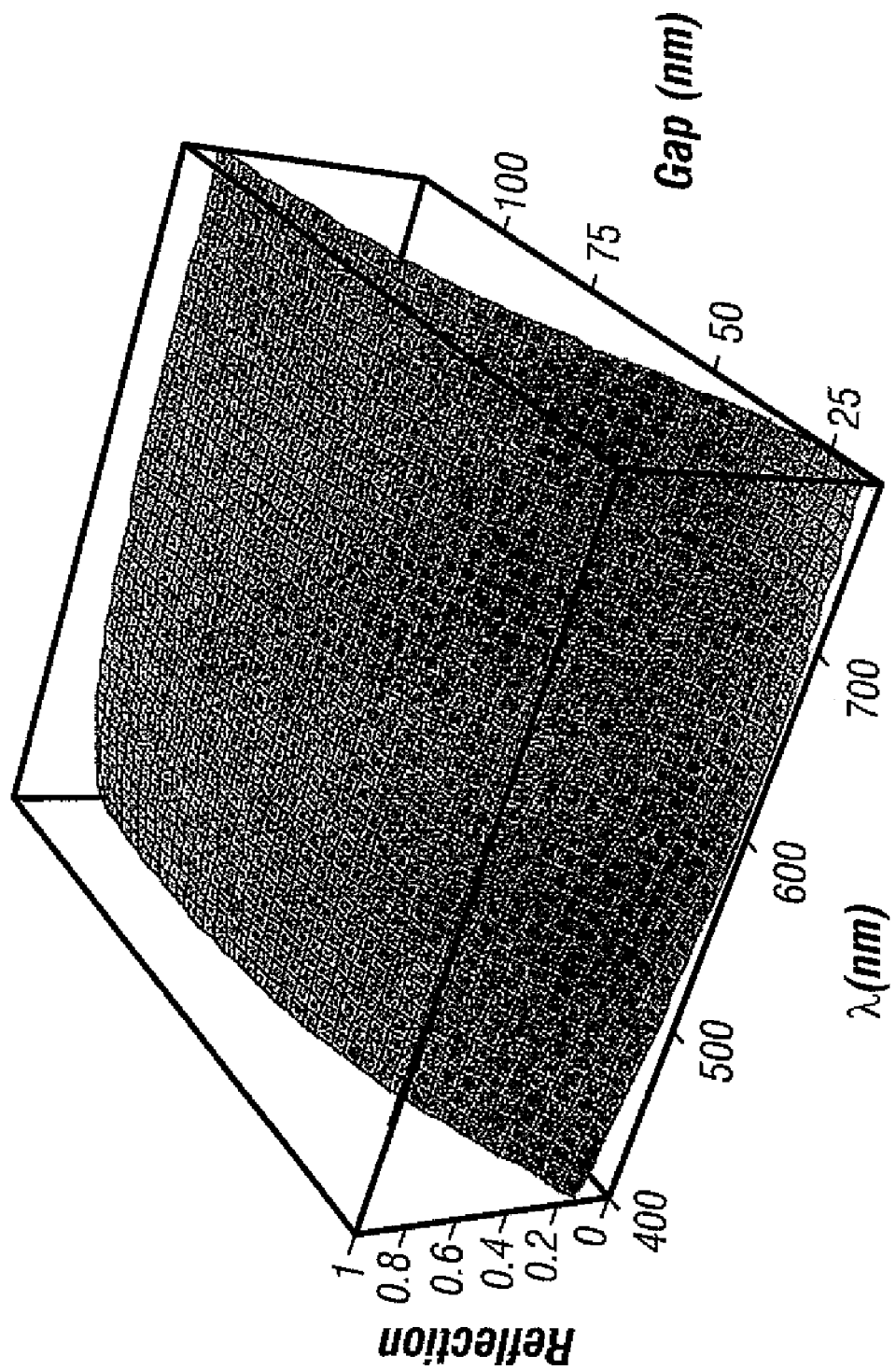
FIG. 8B is a plot of the reflection of the modulator device of FIG. 8A as a function of wavelength and air gap height.
Figure 8C:
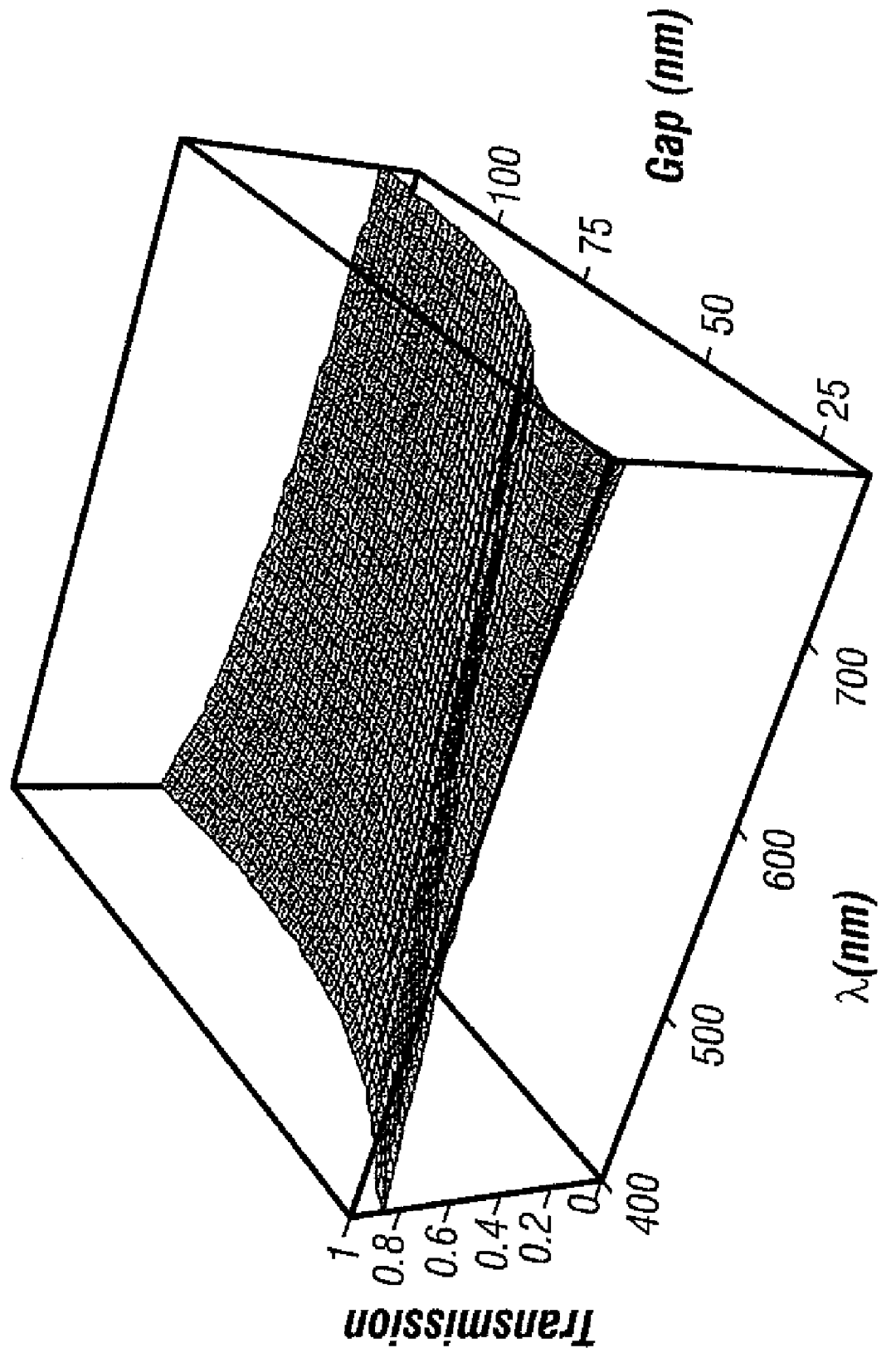
FIG. 8C is a plot of the transmission of the modulator device of FIG. 8A as a function of wavelength and air gap height.

In another simulated device, FIG. 8A illustrates a simplified modulator device 110 which comprises layers 112a and 112b of the theoretical material of FIG. 7B, supported on two comparatively thick glass substrates 116a and 116b, and spaced apart from one another by the air gap 114. If a layer such as the glass substrate 116a or 116b is thick enough relative to the wavelength of the light in question, it no longer functions as a thin film layer and will have little effect on the optical properties of the simulated modulator device 110. For example, if the layer is thicker than the coherent length of the incident light, e.g., greater than 10 microns, the layer will no longer act as a thin film and will have little optical effect beyond the reflectivity of the layer. If the layer is comparatively thin, the optical properties of the simulated modulator device will be affected by the layer. FIG. 8B illustrates the transmission as a function of wavelength and gap size, and FIG. 8C illustrates the reflectance as a function of wavelength and gap size. It can be seen that the inclusion of the glass layers does not have a significant effect on the optical properties of the simulated modulator device 110 when compared with those of the simulated modulator device 100 of FIG. 7A.

Figure 8D:
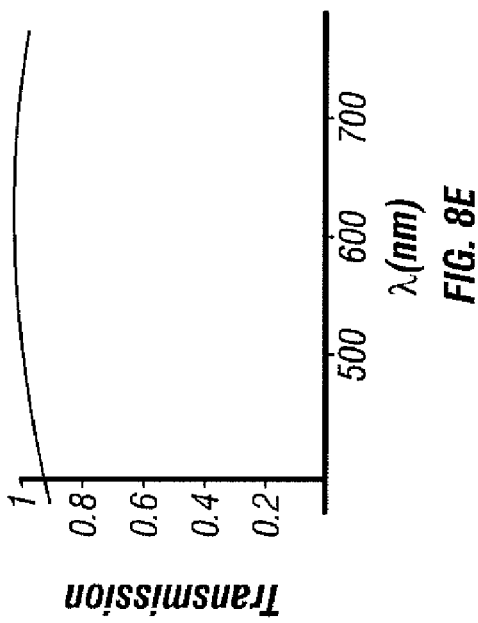
FIG. 8D is a plot of the reflection of the modulator device of FIG. 8A as a function of wavelength for an air gap height of 15 nm.
Figure 8E:
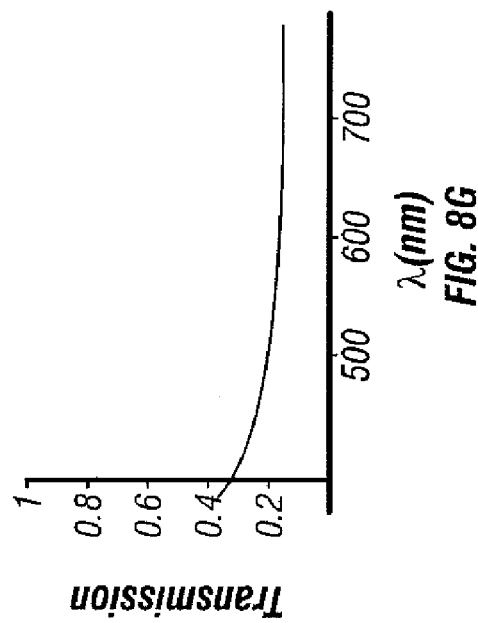
FIG. 8E is a plot of the transmission of the modulator device of FIG. 8A as a function of wavelength for an air gap height of 15 nm.
Figure 8F:
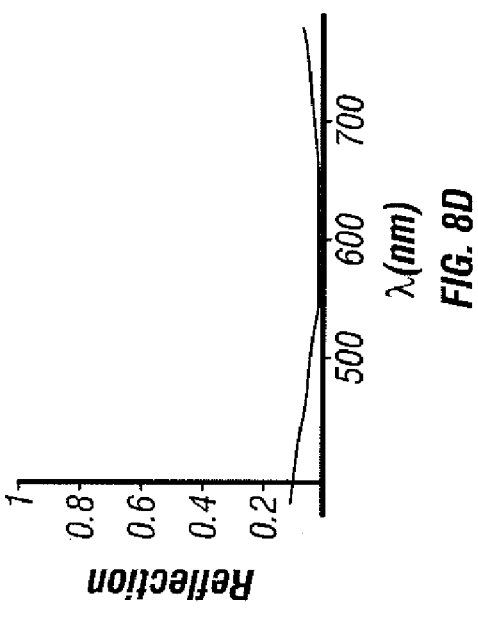
FIG. 8F is a plot of the reflection of the modulator device of FIG. 8A as a function of wavelength for an air gap height of 170 nm.
Figure 8G:
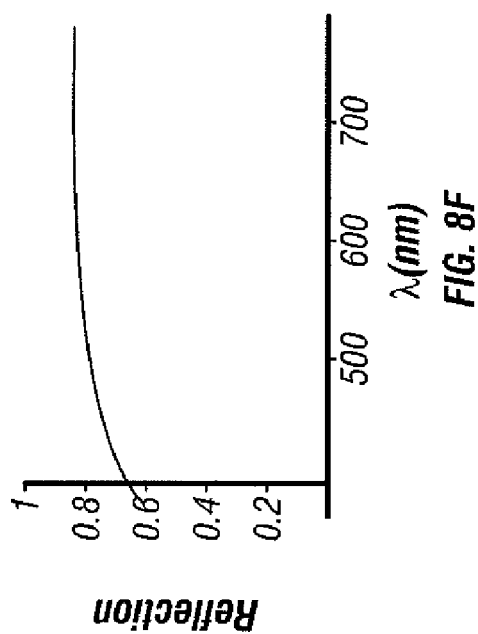
FIG. 8G is a plot of the transmission of the modulator device of FIG. 8A as a function of wavelength for an air gap height of 170 nm.

FIGS. 8D-8G illustrate the modeled transmission and reflection of the simulated modulator device 110 as a function of wavelength $\lambda$ for particular gap sizes. FIGS. 8D and 8E illustrate reflection and transmission as a function of wavelength $\lambda$, respectively, when the gap size is equal to 15 nm. FIGS. 8F and 8G illustrate reflection and transmission as a function of wavelength $\lambda$, respectively, when the gap size is equal to 120 nm. It can be seen that the simulated modulator device 110 can be moved from a state which is almost completely transmissive to one which is roughly 80% reflective for most wavelengths of visible light.

Figure 9A:
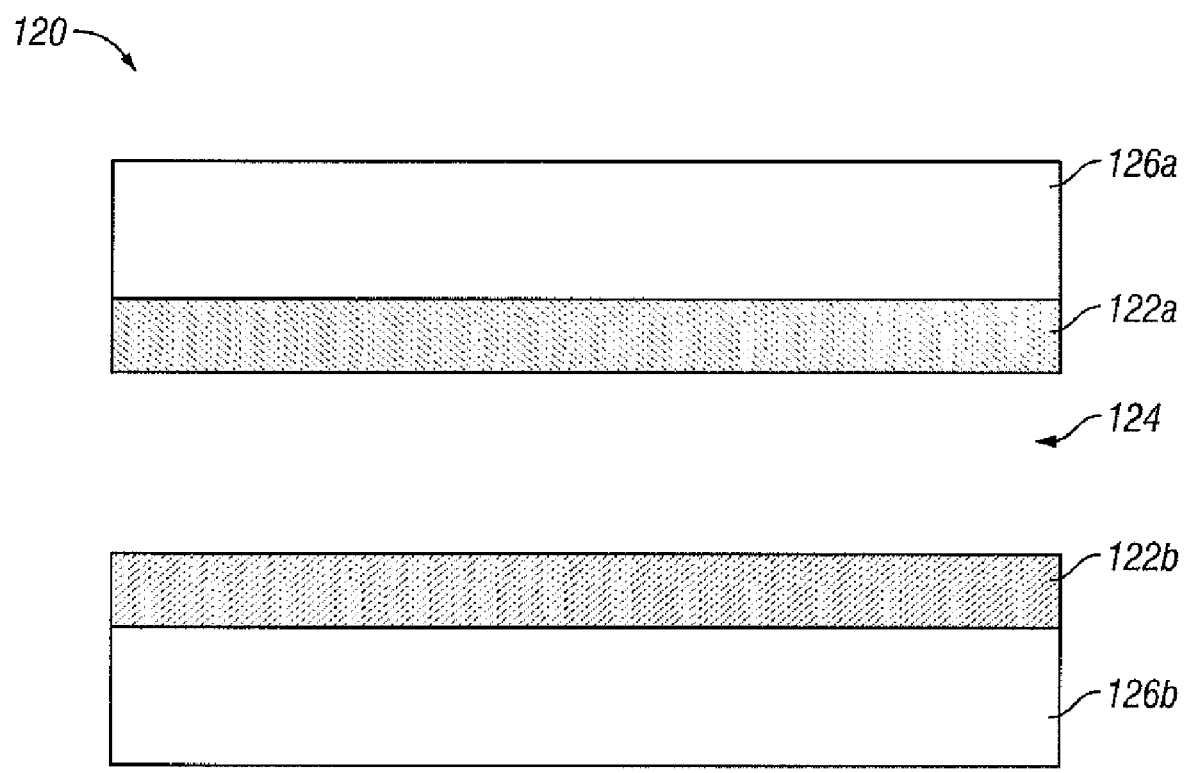
FIG. 9A is a schematic cross-section of another embodiment of a modulator device comprising SiC optical layers.
Figure 9B:
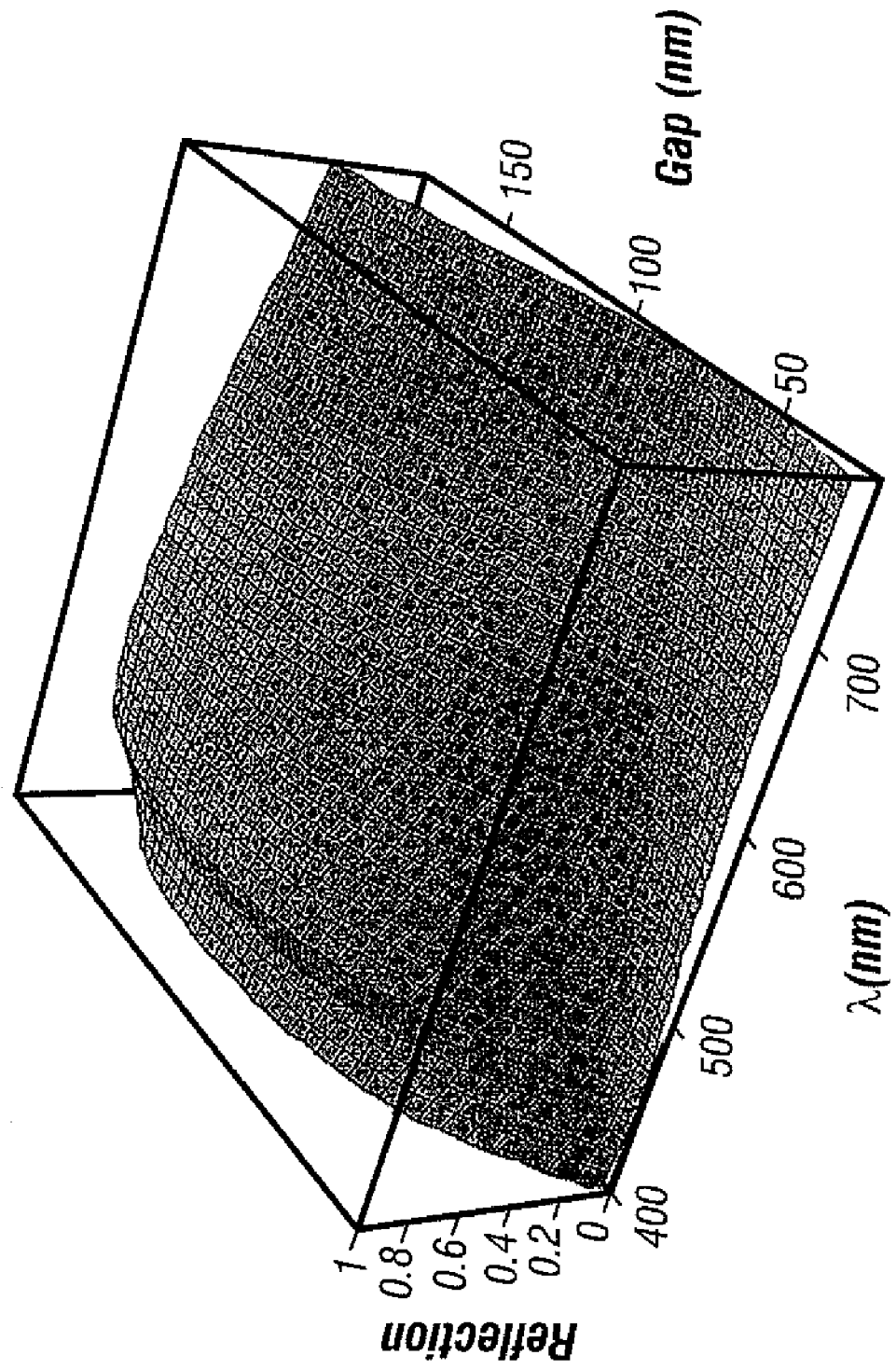
FIG. 9B is a plot of the reflection of the modulator device of FIG. 9A as a function of wavelength and air gap height.
Figure 9C:
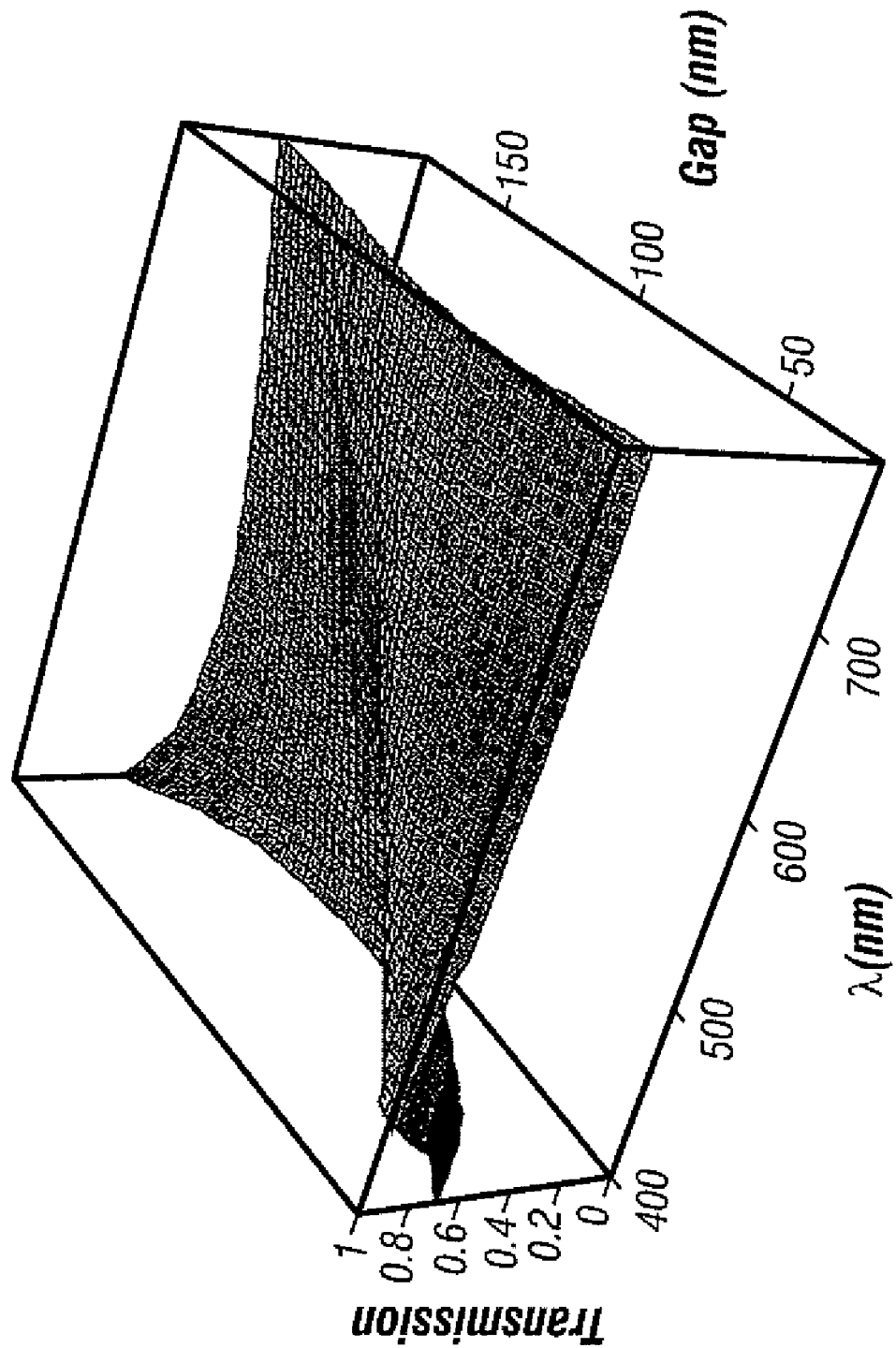
FIG. 9C is a plot of the transmission of the modulator device of FIG. 9A as a function of wavelength and air gap height.

In another embodiment, FIG. 9A illustrates an embodiment of a simplified realizable modulator device 120 similar to that of modulator device 110. The modulator device includes a layer 122a supported by glass substrate 126a and spaced apart by an air gap 124 from another layer 122b supported by glass substrate 126b. The layers 122a and 122b comprise layers of SiC which are roughly 25 nm in thickness. FIG. 9B illustrates the reflection of the modulator device 120 as a function of wavelength $\lambda$ and air gap thickness, and FIG. 9C illustrates the transmission of the modulator device 120 as a function of wavelength $\lambda$ and air gap thickness.

Figure 9D:
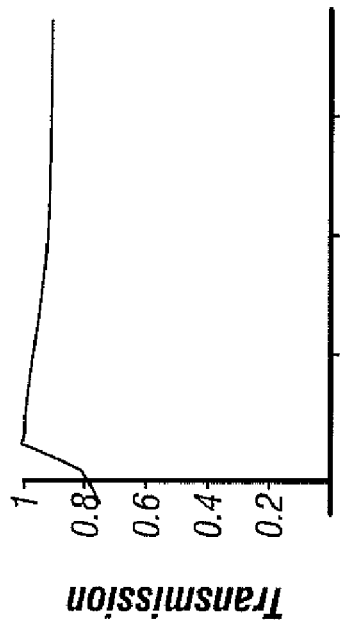
FIG. 9D is a plot of the reflection of the modulator device of FIG. 9A as a function of wavelength for an air gap height of 15 nm.
Figure 9E:
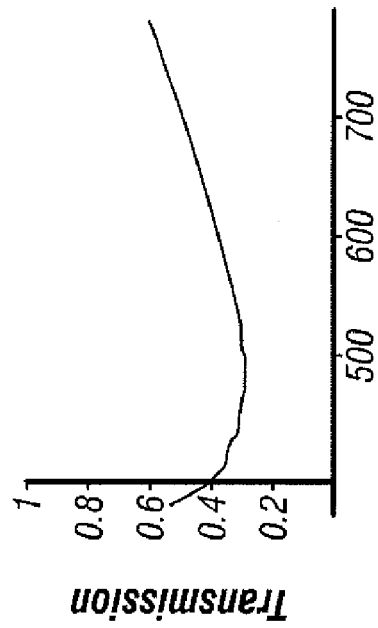
FIG. 9E is a plot of the transmission of the modulator device of FIG. 9A as a function of wavelength for an air gap height of 15 nm.
Figure 9F:
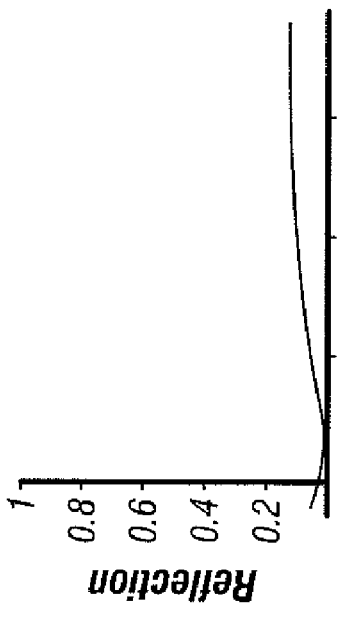
FIG. 9F is a plot of the reflection of the modulator device of FIG. 9A as a function of wavelength for an air gap height of 170 nm.
Figure 9G:
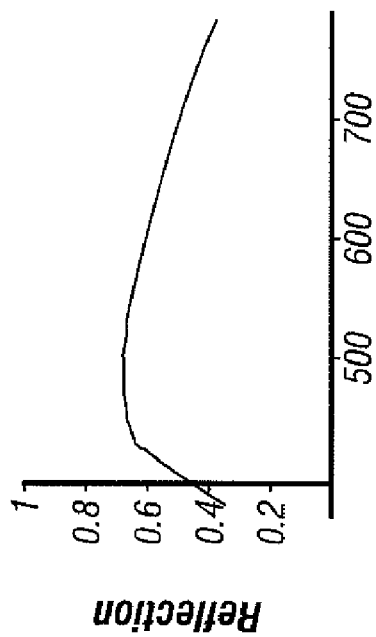
FIG. 9G is a plot of the transmission of the modulator device of FIG. 9A as a function of wavelength for an air gap height of 170 nm.

FIG. 9D illustrates the modeled reflection as a function of wavelength $\lambda$ when the air gap is at 20 nm, and FIG. 9E illustrates the modeled transmission as a function of wavelength $\lambda$ in the same state. FIG. 9F illustrates the modeled reflection as a function of wavelength $\lambda$ when the air gap is at 180 mm, and FIG. 9G illustrates the modeled transmission as a function of wavelength $\lambda$ in the same state. It can be seen that when the air gap is at 20 nm, the modulator device 120 is substantially transmissive across all visible wavelengths, and thus will transmit light without a significant hue. In practice, due to surface roughness of the layers which come into contact with one another, an air gap on the order of roughly 20 nm may in certain embodiments be the smallest achievable air gap when the layers are brought into contact with one another. Similarly, when the air gap is at 180 nm, roughly 50% of the incident visible light will be reflected, and although there is some wavelength-dependency in the degree of reflection, there will not be a significant hue to either the transmitted or reflected light.

Figure 10A:
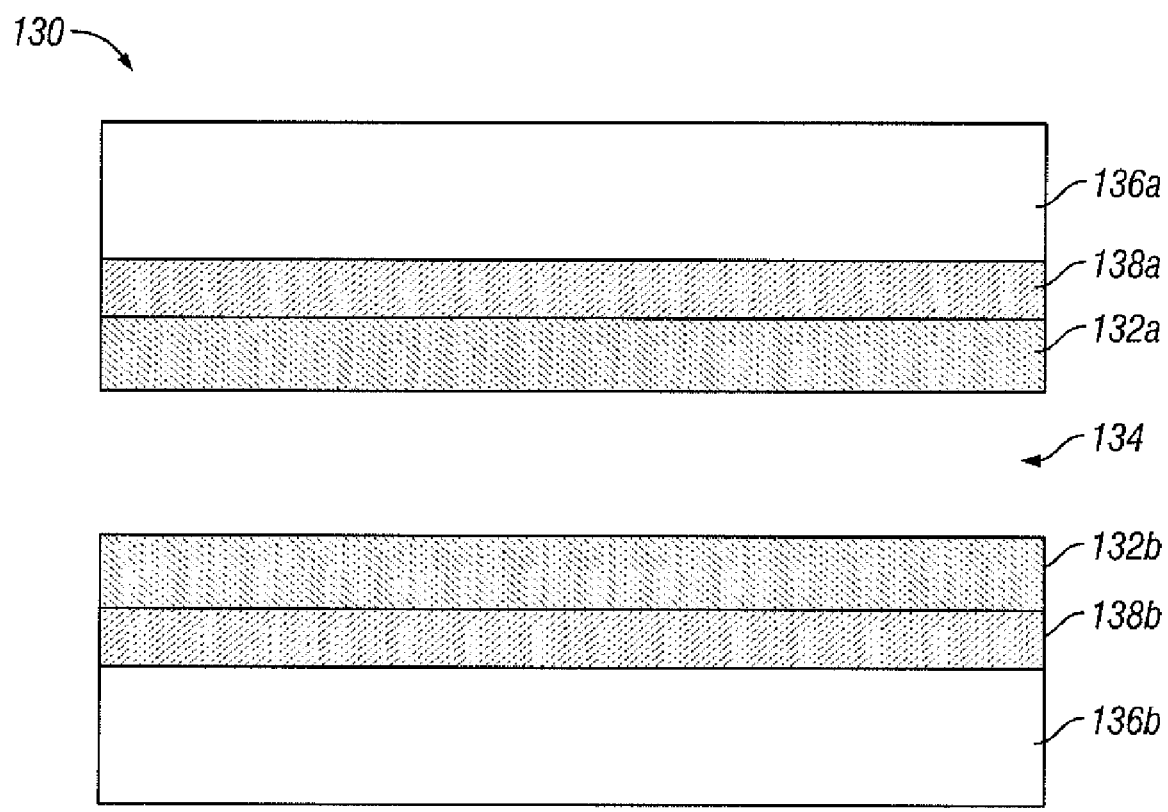
FIG. 10A is a schematic cross-section of an embodiment of an electrostatically actuatable modulator device comprising two or more conductive layers.

In some embodiments, a modulator device may include actuation elements integrated into the thin-film stack which permit displacement of portions of layers relative to one another so as to alter the spacing therebetween. FIG. 10A illustrates an exemplary modulator device 130 which is electrostatically actuatable. The device 130 includes a conductive layer 138a supported by a substrate 136a, and an optical layer 132a overlying the conductive layer 138a. Another conductive layer 138b is supported by substrate 136b and an optical layer 132b overlies the conductive layer 138b. The optical layer 132a and 132b are separated from one another by an air gap. As discussed above, application of a voltage across conductive layers 138a and 138b will cause the one of the layers to deform towards the other one.

In some embodiments, the conductive layers 138a and 138b may comprise a transparent or light-transmissive material, such as indium tin oxide (ITO), for example, although other suitable materials may be used. The optical layers 132a and 132b may comprise a material having a high index of refraction. In some particular embodiments, the optical layers 132a and 132b may comprise titanium dioxide, although other materials may be used as well, such as lead oxide, zinc oxide, and zirconium dioxide, for example. The substrates may comprise glass, for example, and at least one of the substrates may be sufficiently thin to permit deformation of one of the layers towards the other.

Figure 10B:
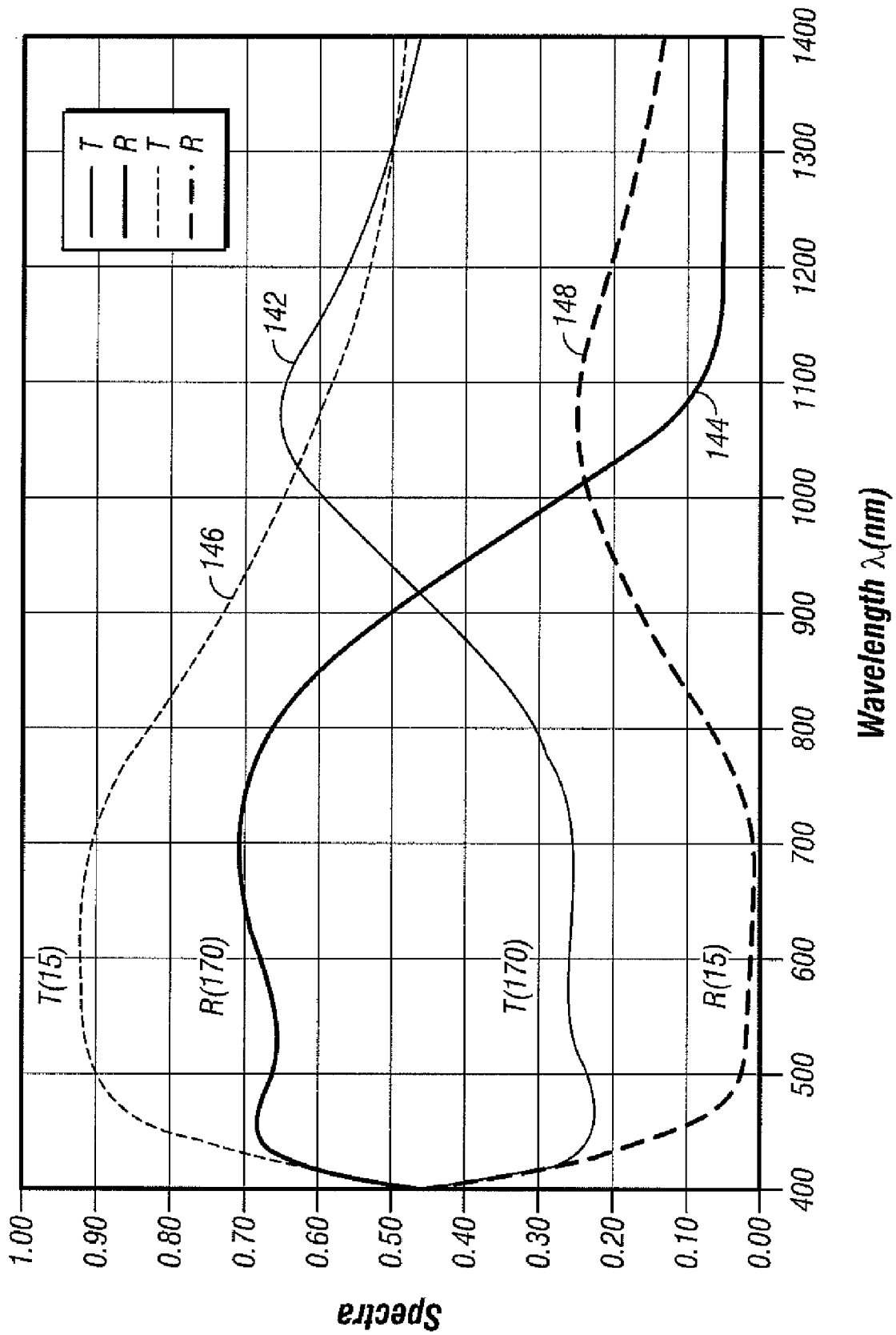
FIG. 10B is a plot of the transmission and reflection of the modulator device of FIG. 10A as a function of wavelength for two air gap heights.

In an embodiment in which the conductive layers 138a and 138b comprise ITO and are 80 nm in thickness, the optical layers 132a and 132b comprise titanium dioxide and are 40 nm in thickness and the air gap is initially 170 nm in height, FIG. 10B illustrates plots across the visible and a portion of infrared wavelengths of the modeled transmission and reflectivity as a function of wavelength λ of the modulator device 130 both when the device is in an actuated state with an air gap of 15 nm and in an unactuated state with an air gap of 170 nm. As previously discussed, the 15 nm air gap represents a fully actuated state, but surface roughness may in some embodiments prevent a further reduction in air gap size. In particular, line 142 illustrates the transmission as a function of wavelength when the device is in an unactuated position (T(170)), and line 144 illustrates the reflectivity in the same state (R(170)). Similarly, line 146 illustrates the transmission as a function of wavelength when the device is in an actuated position (T(15)), and line 148 illustrates the reflectivity in the actuated position (R(15)).

It can be seen from these plots that the modulator device 130 is highly transmissive across visible wavelengths when in an actuated state with a small air gap (15 nm), particularly for those wavelengths of less than about 800 nm. When in an unactuated state with a larger air gap (170 nm), the device becomes roughly 70% reflective to those same wavelengths. In contrast, the reflectivity and transmission of the higher wavelengths, such as infrared wavelengths, does not significantly change with actuation of the device. Thus, the modulator device 130 can be used to selectively alter the transmission/reflection of a wide range of visible wavelengths, without significantly altering the infrared transmission/reflection. As can be seen in FIG. 10B, the transmissivity of infrared light does not significantly vary when the MEMS device is actuated, as the difference in transmissivity between the unactuated and actuated states remains within roughly 10% of the incident infrared light. By changing the thicknesses or types of materials comprising the layers within the modulator device, it would be possible maintain this small difference in transmittance while increasing or decreasing the overall transmittance of infrared light.

Figure 11A:
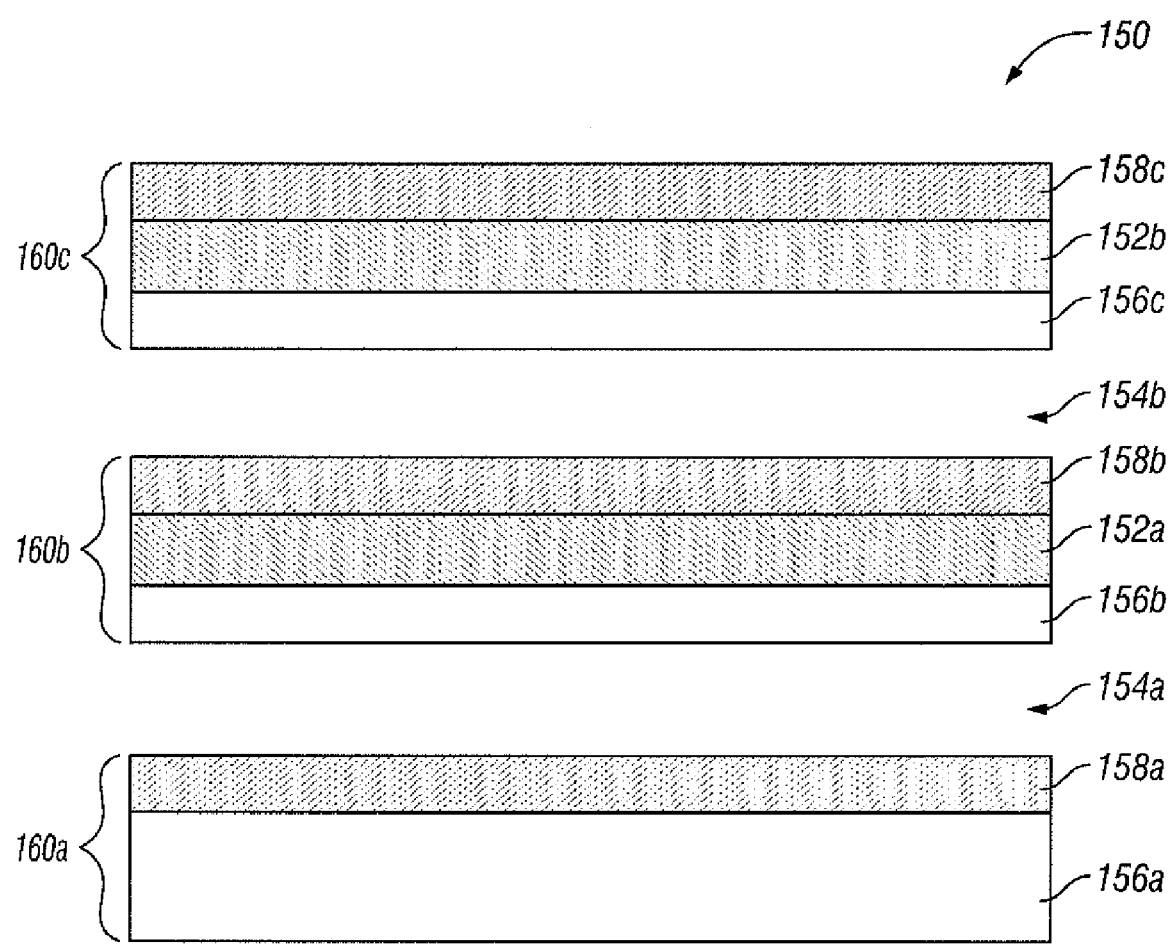
FIG. 11A is a schematic cross-section of an embodiment of an electrostatically actuatable modulator device comprising multiple air gaps.

In another embodiment, a modulator device may be provided having multiple air gaps. FIG. 11A illustrates such a modulator device 150. The modulator device 150 includes a lower composite layer 160a, comprising a base substrate 156a on which a first conductive layer 158a is formed. An intermediate composite layer 160b comprising a support layer 156b, a first optical layer 152a, and a second conductive layer 158b is spaced apart from the lower composite layer 160a via a first air gap 154a. Above the intermediate composite layer 160b, an upper composite layer 160c includes a support layer 156c, a second optical layer 152b, and a third conductive layer 158c. The upper composite layer 160c is spaced apart from the intermediate composite layer 160b via second air gap 154b.

Figure 11B:
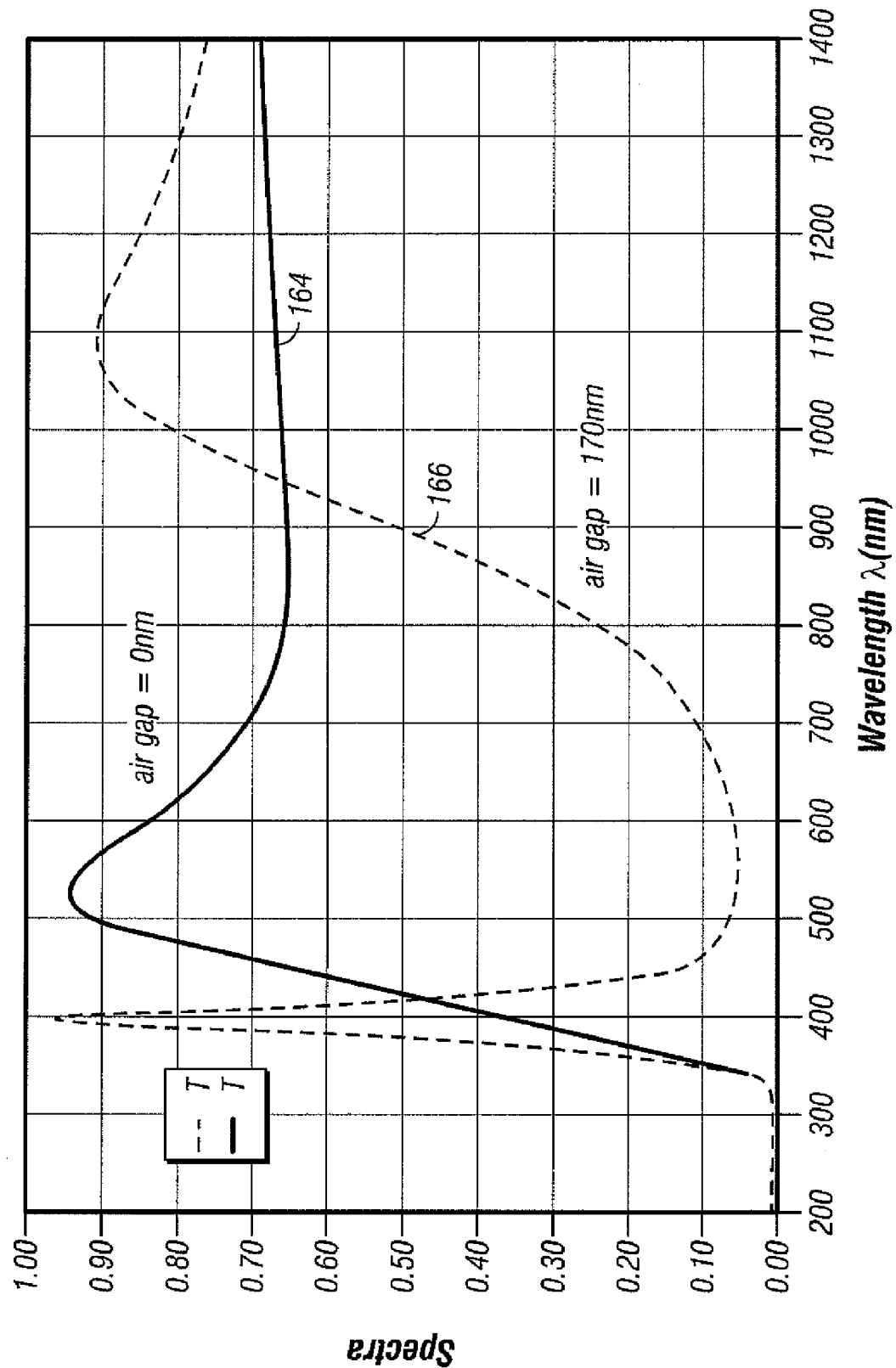
FIG. 11B is a plot of the transmission of the modulator device of FIG. 10A as a function of wavelength for two gap heights.

In a particular embodiment, the substrate 156a may comprise glass, and the support layers 156b and 156c may comprise layers of silicon dioxide roughly 10 nm in thickness. The conductive layers 158a, 158b, and 158c may comprise layers of ITO roughly 10 nm in thickness. The optical layers 152a and 152b may comprise layers of titanium dioxide roughly 30 nm in thickness. FIG. 11B illustrates the modeled transmissivity of such a modulator device 150 as a function of wavelength λ in two states. Line 164 shows the transmissivity in the collapsed state, where the air gaps 162a and 162b have a height of roughly 0 nm, and the composite layers are substantially in contact with one another. Line 166 shows the transmissivity in the uncollapsed state, with an air gap of 170 nm.

It can be seen that, similar to the particular embodiment of modulator device 140 of FIG. 10A discussed above, the particular embodiment of the modulator device 150 of FIG. 11A can be switched between a state having high transmissivity to a wide range of visible light and a state having high reflectivity to roughly the same range of visible light. The modulator device 150 will have a somewhat greenish-gold tint, given the particular transmissivity of certain wavelength ranges. This can be done without significantly altering the infrared transmissivity.

In another embodiment, a modulator device may be provided wherein dielectric mirrors are movable relative to one another. FIG. 12A illustrates an example of such a modulator device 170. The modulator device 170 includes a lower composite layer 180a comprising a substrate 176a, a conductive layer 178a, and a dielectric optical layer 172a. The dielectric layer 172a may comprise dielectric sublayers 182a and 184b. Modulator device 170 also includes an upper composite layer 180b separated from lower composite layer 180a via an air gap 174. Upper composite layer 180b may comprise a substrate 176b, a conductive layer 178b, and a dielectric optical layer 172b, which itself may comprise dielectric sublayers 184b and 186b.

In a particular embodiment, the substrates 176a and 176b may comprise silicon dioxide, and the conductive layers 178a and 178b may comprise ITO. The dielectric optical layers 172a and 172b may comprise sublayers 184a and 184a of silicon oxide and sublayers 186a and 186a of titanium dioxide. In other embodiments, alternate materials may be used, and additional sublayers may be included in the dielectric layer, as well. In particular, although only a single sublayer of each type is shown in each dielectric layer for the sake of simplicity, multiple sublayers of each type may be arranged in an alternating manner. In certain embodiments, 20 such sublayers of each type may be included in a dielectric optical layer, but more or less sublayers of each type may be used. In addition, although the illustrated embodiments depicts the sublayers in specific positions relative to one another, the positions of the dielectric sublayers relative to one another may be reversed in one or more of the dielectric mirrors without significantly affecting the overall optical properties of the modulator device.

Figure 12B:
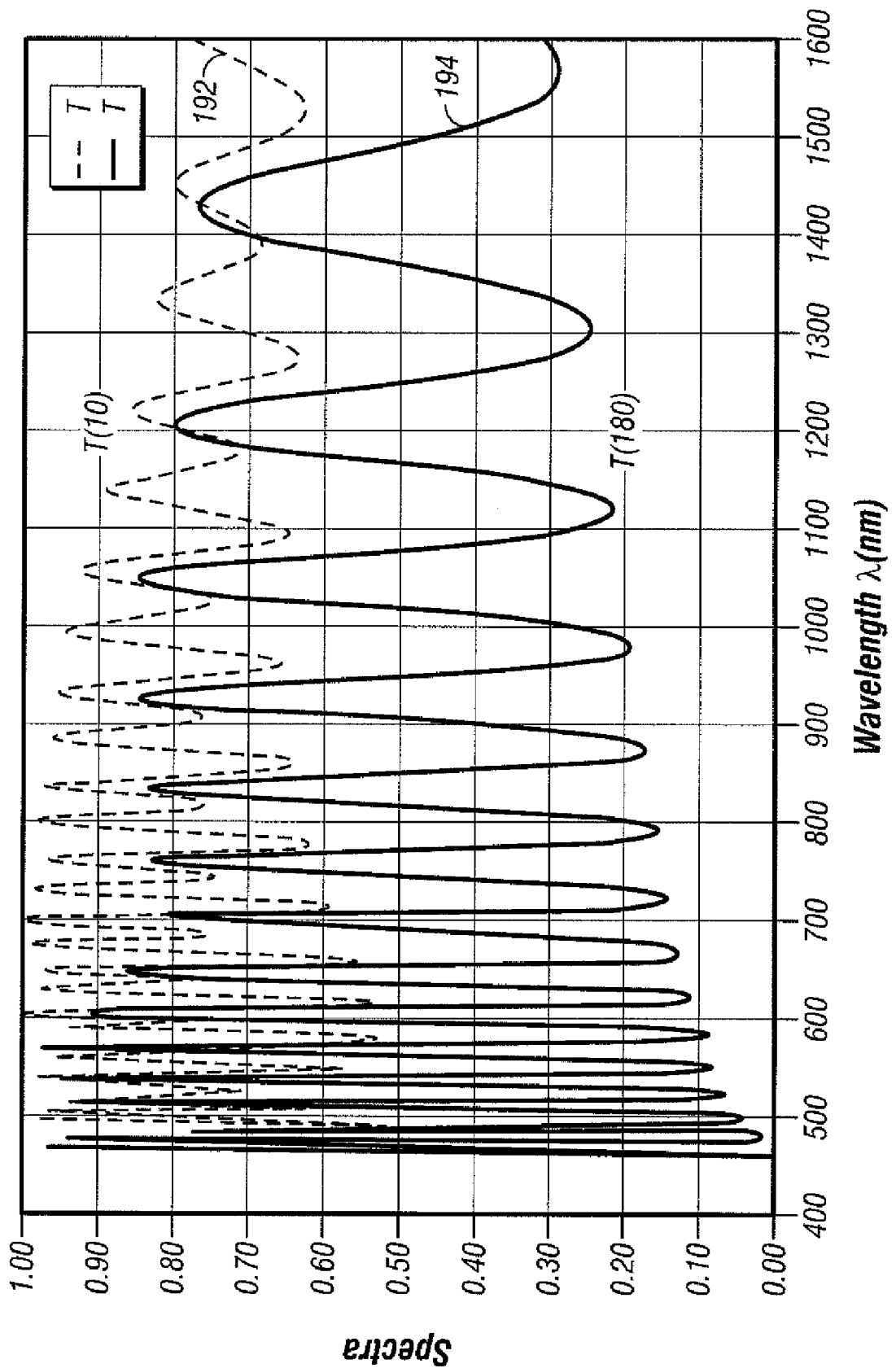
FIG. 12B is a plot of the transmission of the modulator device of FIG. 12A in first and second states.

FIG. 12B illustrates the modeled transmission characteristics of a particular embodiment of modulator device 170 discussed above as a function of wavelength λ wherein the titanium dioxide sub layers have a thickness of 55 nm, the silicon oxide sublayers have a thickness of 20 nm, and the dielectric optical layers 172a and 172b comprise twenty titanium dioxide sublayers and twenty silicon oxide sublayers arranged in an alternating fashion. In addition, the ITO layers have a thickness of 10 nm, and the air gap is 180 nm in an unactuated state, and 10 nm in an actuated state. In particular, FIG. 12B shows the modeled transmission 192 in an actuated state (T(10)) and the modeled transmission 194 in an unactuated state (T(180)). It can be seen that although there is a significant amount of variance over short wavelength ranges characteristic of dielectric mirrors, the overall transmission in the first range is high (roughly 80%) for a wide range of visible and infrared wavelength ranges above roughly 500 nm. In addition, despite the sharpness of the variance within small wavelength ranges, the overall effect will be of a modulator device having only a slight orange-reddish hue. When the modulator device is in the second state, the transmission is reduced to roughly 50%. Not shown in the figure is that for visible wavelengths below about 550 nm, the modeled modulator device gives nearly 100% reflection or transmission.

The modulator device 170 thus provides a device which is capable of changing from roughly 80% transmission in visible and infrared to roughly 50% transmissive in visible and infrared. In addition, there is essentially no angle dependence, as the response is substantially constant over wide ranges of wavelengths. The alteration in the length of the optical path which occurs when the angle of view is changed will thus have little effect on the appearance of the device. As will be discussed in greater detail below, if greater reduction in the transmission of a particular range of wavelengths is desired, the modulator device 170 may be provided in conjunction with an additional modulator device so as to obtain the desired level of transmission. In some embodiments, the additional modulator device may be a fixed film having desired properties, and in other embodiments the additional modulator device may be a modulator device such as those discussed above, having a layer which is movable through an air gap.

It can also be seen that the lack of significant absorption within the modulator device 170 yields a transmission rate, for example, which is roughly equal to 1 minus the reflection. The lack of absorption may prove useful in certain applications, such as when the modulator device is incorporated into a window. In other embodiments, absorptive material may be used, for example, to provide a modulator device having a desired hue, whether for aesthetic or other reasons.

Figure 13:
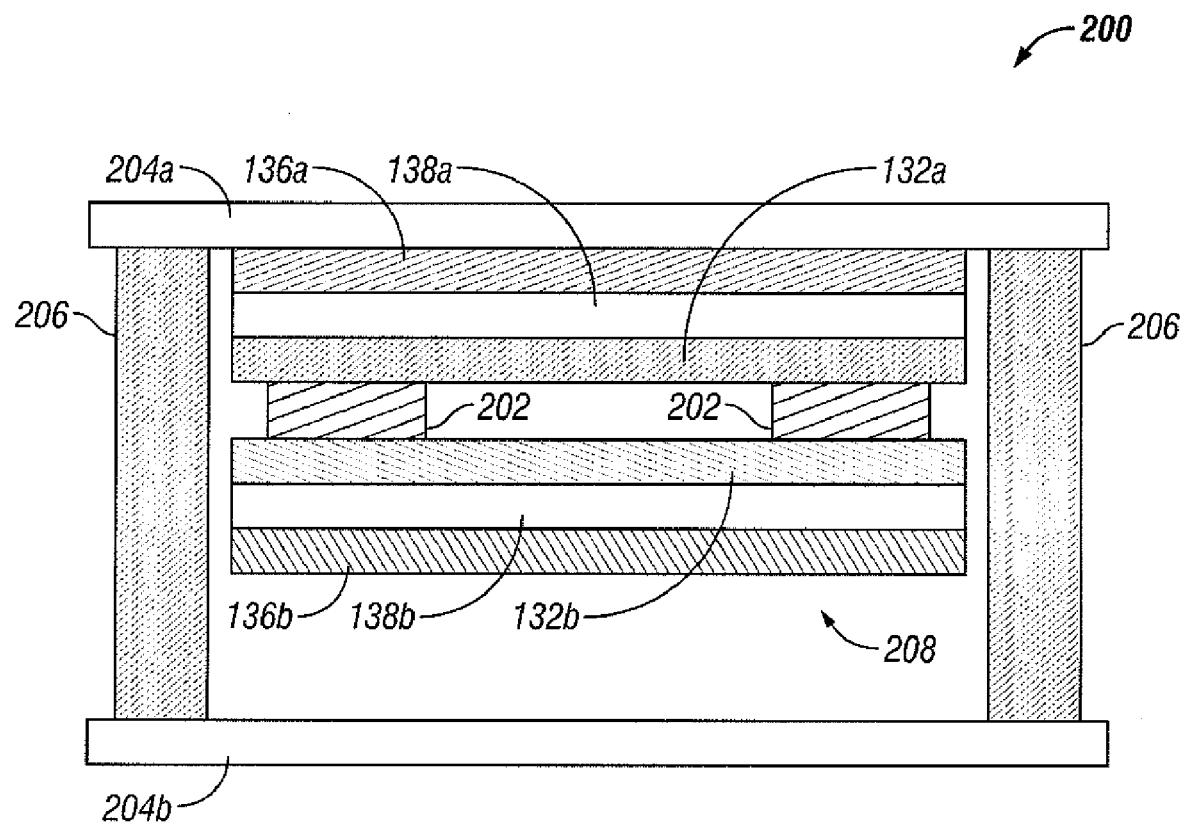
FIG. 13 is a schematic cross-section of a double pane window comprising a modulator device such as that of FIG. 10A.

In certain embodiments, modulator devices such as those discussed above may be fabricated using MEMS manufacturing techniques, and may be incorporated into structures such as double pane windows for use in housing, commercial buildings, and the like. FIG. 13 schematically illustrates an example of a double pane window 200 comprising a modulator device fabricated in such a manner. In particular, it can be seen that the double pane window 200 comprises a modulator device 208 which may in certain embodiments be substantially similar to the modulator device 130 of FIG. 10A. The modulator device 208 comprises support structures or spacers 202 throughout the modulator device so as to maintain a desired air gap height when the modulator device 208 is in an unactuated state. In one embodiment, the modulator device 208 may be formed via sequential deposition of layers using techniques such as, for example, chemical vapor deposition or physical vapor deposition. The air gap may be formed via deposition and subsequent removal of a sacrificial layer of a desired thickness, or may be formed by lamination techniques with included support structures to form the air gap. The support structures 202 may comprise a dielectric material which has been deposited and patterned. In order to facilitate the fabrication of the modulator device, one of the support layers may comprise a deposited layer of a suitable material, such as silicon oxide, rather than a preformed substrate.

Figure 14:
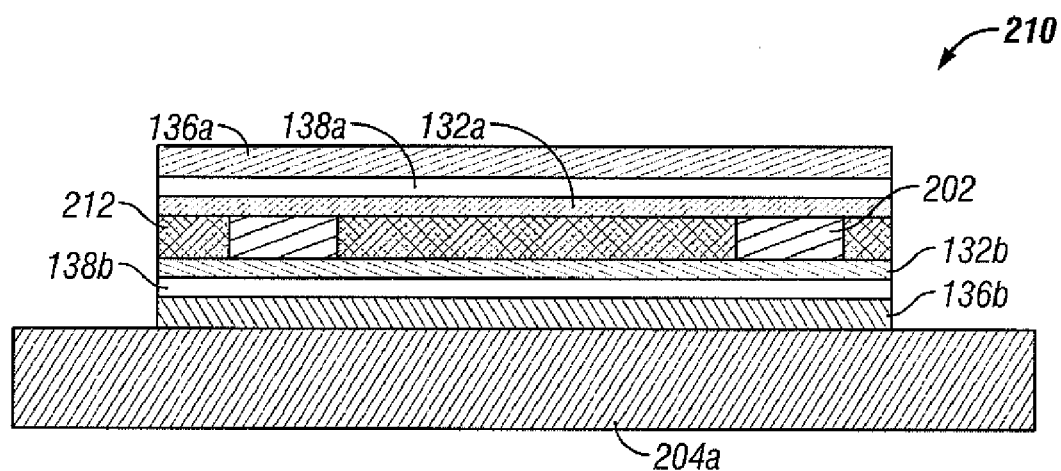
FIG. 14 is a schematic cross-section of the partially fabricated modulator device of FIG. 13.

FIG. 14 illustrates a partially fabricated modulator device 210 formed by such a process. In the illustrated embodiment, the substrate 204a is sufficiently thick that it has a minimal impact on the optical properties of the modulator. A layer 136b of a suitable material, such as silicon oxide, is deposited on the substrate 204a, followed by a layer 138b of conductive material, such as ITO, and an optical layer 132b, such as titanium dioxide or another material with a high index of refraction. In some embodiments, materials having an index of refraction greater than about 1.8 may be used, although in other embodiments materials having higher indices of refraction may be used, such as materials with an index of refraction of 1.9 or higher. Above the optical layer 132b is a sacrificial layer 212 through which the support structures 202 extend. In some embodiments, the support structures 202 may be formed prior to the deposition of the sacrificial layer 212, which may be deposited over the support structures 202 and may comprise a planarization material or may be etched back to the desired height. In other embodiments, the sacrificial layer 212 may be formed prior to the support structures, and patterned to form apertures in which the support structures 202 are later formed. The height of the air gap will be affected by the height of the support structures 202 and the sacrificial layer 212.

Subsequently, an optical layer 132a, a conductive layer 138a, and a support layer 136a are formed over the sacrificial layer 212 and the supports 202. It can be seen that, in the illustrated embodiment, the bottom layers 136b, 138b, and 132b, with the exception of the thick substrate 204a, are the mirror image of the upper layers 136a, 138a, and 132a. Electrical connections between the upper conductive layer 128a and any necessary driver or actuation circuitry (not shown) can be formed at the periphery of the modulator device, or at the periphery of the pixels, if there are multiple pixels. The sacrificial layer 212 may be subsequently removed, such as by an etching process, so as to release the modulator device 210. In certain embodiments, small etch holes may be formed in the upper layers 136a, 138a, and 132a so as to permit access by the etchant to the sacrificial layer 212 throughout the device, rather than only at the exposed periphery.

Alternate fabrication techniques may be utilized. In another embodiment, the various layers may be formed by laminating preformed stacks onto the substrate. The spacers may comprise, for example, glass spheres of the desired diameter which are spaced throughout the modulator device. In another embodiment, a combination of thin film deposition and lamination may be utilized to form the modulator device.

Once the modulator device 210 of FIG. 14 has been formed on one of the two glass panes 204a and 204b of FIG. 13, the two panes may be sealed to one another via seal 206 to form the double pane window 200 seen in FIG. 13. The air gap between the modulator device 130 and the opposite pane 204b may be substantially larger than the height of the modulator device 130, and the opposite pane will thus serve as a protective backplate, and protect the modulator device 130 from mechanical or other interference.

As noted above, multiple transmission-altering or reflection-altering structures may be provided in conjunction with one another, so as to achieve a desired result. In one embodiment, a modulator device may be formed on each of the interior surfaces of the double pane window 200. In another embodiment, a fixed thin film stack may be provided, either between the modulator device and the supporting substrate, or on an alternate surface of the double pane window. It will also be understood that any suitable modulator device may be formed in place of the modulator device.

Figure 15:
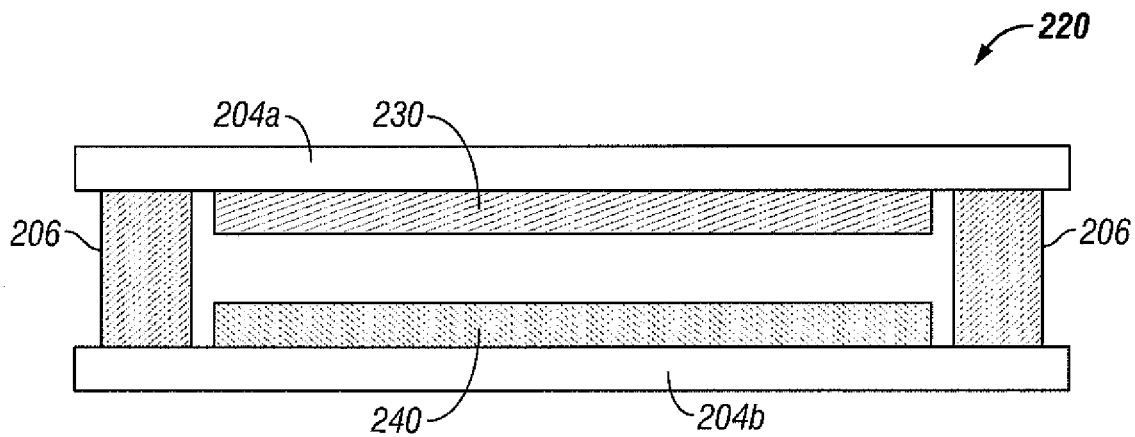
FIG. 15 is a schematic cross-section of a double pane window comprising a modulator device and an additional device.

FIG. 15 illustrates such an embodiment of a window 220, in which a first modulator device 230 is formed on a first glass pane 204a, and a second device 240 is formed on a second glass pane. In one embodiment, the first modulator device 230 comprises a modulator device discussed herein. In a particular embodiment, the first modulator device 230 comprises the modulator device 170 of FIG. 12A, and is capable of switching between a state which is substantially transmissive to a wide range of visible and IR radiation and another state in which the reflectance across a wide range of visible and IR radiation is increased.

The second device 240 may in certain embodiments comprise a device which transmits a certain amount of incident light. In certain embodiments, the device 240 may comprise a device which absorbs a certain amount of incident light. In particular embodiments, the device 240 may be switchable between a first state which is substantially transmissive to incident light, and a second state in which the absorption of at least certain wavelengths is increased. In still other embodiment, the device 240 may comprise a fixed thin film stack having desired transmissive, reflective, or absorptive properties.

In certain embodiments, suspended particle devices (SPDs) may be used to change between a transmissive state and an absorptive state. These devices comprise suspended particles which in the absence of an applied electrical field are randomly positioned, so as to absorb and/or diffuse light and appear "hazy." Upon application of an electrical field, these suspended particles are aligned in a configuration which permits light to pass through. Other devices 240 may have similar functionality. In another embodiment, an interferometric modulator device having similar functionality may be used.

Thus, when the device 240 comprises an SPD or a device having similar functionality, the window 220 can be switched between three distinct states: a transmissive state, when both devices 230 and 240 are in a transmissive state, a reflective state, when device 230 is in a reflective state, and an absorptive state, when device 240 is in an absorptive state. Depending on the orientation of the window 220 relative to the incident light, the device 230 may be in a transmissive state when the window 220 is in an absorptive state, and similarly, the device 240 may be in a transmissive state when the window 220 is in an absorptive state.

In another embodiment, devices 240 and 230 may comprise multiple movable layers spaced apart from each other by air gaps. In a particular embodiment, the devices may comprise a plurality of dielectric layers spaced apart from one another by a movable air gap. The device may comprise a first conductive layer located on the substrate, and an uppermost movable layer comprising a second conductive layer overlying a dielectric layer. Between the first conductive layer and the second conductive layers are a plurality of movable dielectric layers spaced apart from one another by a uniform distance when the device is in an unactuated state. Upon application of a voltage between the first and second conductive layers, the movable layers may collapse so as to significantly reduce the spaces between the movable layers.

Figure 16:
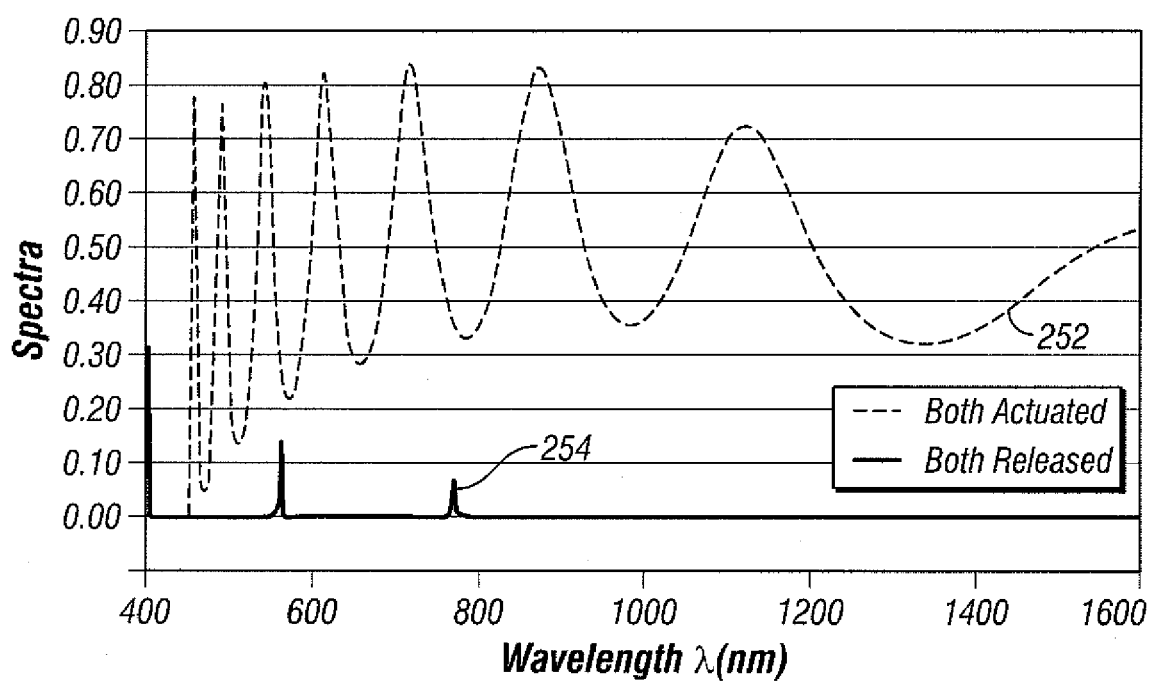
FIG. 16 is a plot of the transmission of a modulator device having multiple intermediate dielectric layers in first and second states.

In a specific embodiment of a window 220, the optical response of which is shown as a function of wavelength λ (in nm) in FIG. 16, the devices 230 and 240 may comprise first and second conductive layers formed from ITO having a thickness of about 20 nm. The upper movable layer comprises the second conductive layer and an underlying titanium dioxide layer having a thickness of about 52 nm. Nine intermediate titanium dioxide layers having thicknesses of about 52 nm are spaced apart from adjacent layers by air gaps. In an unactuated state, the air gaps of device 230 are about 500 nm, and the air gaps of device 240 are about 330 nm. When voltages are applied so as to pull the uppermost movable layer towards the substrate, the air gaps of both device 230 and 240 collapse to about 20 nm due to surface roughness of the adjacent surfaces.

As can be seen in FIG. 16, when the devices 230 and 240 are in an actuated state, roughly 50% of incident visible and infrared light is transmitted through the device. The transmittal of light when both devices are in an actuated state is shown by 252. When the device is released, the device functions as a nearly perfect broad band mirror, reflecting almost all incident visible and infrared light. The transmittal of light when both devices are in an unactuated state is shown by 254. Although this embodiment has been discussed with respect to a window 220 in which the devices 230 and 240 are on separate panes, a sufficiently thick substrate may be used to support devices 230 and 240 on opposite sides of a single substrate.

In an embodiment in which a modulator device is electrostatically actuatable, the size of the air gap may be altered by applying a voltage across the conductive layers, as discussed above, such that one or both of the layers moves through and collapses the air gap. The voltage required to actuate the modulator device depends on a variety of factors, including but not limited to the total area of the modulator device, the height of the air gap, and the effective spring constant of the movable layer. The effective spring constant of the movable layer is dependent upon, among other factors, the residual tensile stress within the layers, the thicknesses and composition of the layers, and the spacing of any support structures throughout the modulator device. The modulator device may be configured such that the voltage necessary to actuate the device is less than the dielectric breakdown strength of the materials located between conductive layers. This number may vary significantly depending on the particular materials used and the thicknesses of the layers, but in certain embodiments, the actuation voltage is less than 100 V.

Because the modulator device may in certain embodiments have a uniform reaction across its surface, the modulator device may not need the resolution necessary to function as a display device. In one embodiment, a double pane window may comprise effectively only a single pixel, wherein the conductive layer in the movable layer comprises a contiguous layer, although it may be patterned into a desired shape. In although in other embodiments multiple pixel-like regions may be used, and the movable conductive layer may comprise multiple discrete portions permitting the actuation of one portion without the actuation of all portions. The actuation voltage is independent of the area of the modulator, and thus for given parameters such as residual stress, support spacing, and air gap heights, the actuation voltage will be substantially constant for windows or "pixels" of any size.

Because the pixels can be very large, even the entire size of an architectural window or other physically large product, the support structures need not be as tightly packed as in a display device, in which the support structures may help to define the pixels and may be spaced apart from each other on the order of 200 um or less. In one embodiment of the modulator device 130 for example, the spacers may be on the order of several millimeters apart, reducing the effective spring constant and thus the voltage required to actuate the device.

In certain embodiments, a modulator device may be used to provide a grayscale-like effect with a level of reflectivity or transmissivity between those provided by the two discrete actuated and unactuated states. Such a grayscale-like effect may be provided in at least two ways. In one embodiment, spatial dithering may be used so that only a portion of the modulator device is actuated at a given time, so as to provide such a grayscale effect. In one embodiment, the modulator device may comprise a plurality of independently controllable areas. In certain embodiments, these areas may have a size small enough that actuation of a plurality of the areas, such as in a uniform or semiregular tiling, e.g., checkerboard, triangular, hexagonal, or other geometric pattern, produces a visual effect that appears that the overall reflectivity and/or transmissivity of the window is being modified without producing a noticeable pattern. In some embodiments, the areas may be actuated to yield a user-noticeable pattern, for example to create "see through" signage, to provide "virtual mullions" (dividers) for a large window, and the like.

In another embodiment, temporal dithering may be used, by repeatedly actuating and unactuating the device, such that the modulator device is transmissive and/or reflective for only a particular percentage of the time, yielding a similar grayscale effect. This may also be done in conjunction with the use of small areas, and in certain embodiments may be done in conjunction with spatial dithering, such as by actuating a checkerboard-like pattern of areas and then switching the unactuated areas to actuated and vice versa.

Selective actuation of certain areas may be used for other reasons, as well. For example, in sufficiently large windows, it may be desirable to actuate only a portion of the window, such as the portion currently being exposed to incident light, while not actuating another portion, such as a portion shaded by an awning or other structure.

In certain embodiments, the actuation of the modulator devices may be user-controlled, such as via a switch. In other embodiments, actuation may be automated, and based upon a time. For example, the modulator may be in an actuated position during the summer months, or during the day. In still other embodiments, sensors connected to the control circuitry may be used to determine when the modulator device is actuated. For example, the amount of incident light and/or the wavelengths of the incident light may determine whether infrared reflectivity is necessary, for example based upon an infrared-sensitive sensor, or whether privacy glass should become reflective or opaque. The sensitivity of a sensor can be controlled, for example, through the use of an overlying filter. In some embodiments, one or more sensors may be placed on both sides of the window, for example to compare visible and/or infrared energy outside a building to that found within the building. Appropriate control logic may be included in a circuit to control the characteristics of the modulator device(s) within the windows, such as wavelength dependence or sensitivity. In certain embodiments, sensors may be used to determine the current lighting conditions of a portion of a window and may independently control the state of those portions accordingly.

As previously noted, the embodiments described herein may be included in a wide variety of structures or devices. For example, the devices may be included in windows of any size, including architectural windows such as those in residences or office buildings, as well as vehicle windows and any other windows for which modification of transmittance may be desirable, such as eyeglasses. Because of the thin film nature of certain embodiments described herein, such embodiments may also be included in windows or other structures or devices which have any amount of curvature.

While the above detailed description has shown, described and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An electromechanical device, comprising:
   a first film stack disposed upon a substrate, wherein the first thin film stack comprises a first titanium dioxide layer about 40 nm in thickness; and
   a second film stack spaced apart from the first film stack by a gap, wherein the second film stack comprises a second titanium dioxide layer about 40 nm in thickness, wherein the second film stack is movable between a first position and a second position so as to alter the transmission of a wide range of visible wavelengths without significantly altering the transmission of infrared light.

2. The electromechanical device of claim 1, wherein the electromechanical device transmits at least about 50% more of the incident visible light when in said first position than in said second position.

3. The electromechanical device of claim 1, wherein the difference between the transmitted infrared light in the first position and the transmitted infrared light in the second position is no more than 10% of the incident infrared light.

4. The electromechanical device of claim 1, wherein the infrared light comprises infrared light having a wavelength of less than 1.5 microns.

5. The electromechanical device of claim 1, wherein the first thin film stack further comprises a first conductive layer, and wherein the second thin film stack further comprises a second conductive layer.

6. The electromechanical device of claim 5, wherein the first and second conductive layers comprise contiguous layers.

7. The electromechanical device of claim 5, wherein the first and second conductive layers comprise layers of indium tin oxide about 80 nm in thickness.

8. The electromechanical device of claim 1, additionally comprising a fixed thin film stack configured to reflect a substantial portion of incident light, wherein the fixed thin film stack is disposed between the first film stack and the substrate.

9. The electromechanical device of claim 8, wherein the fixed thin film stack is configured to reflect a substantial portion of incident infrared light.

10. The electromechanical device of claim 1, additionally comprising support structures located between said first thin film stack and said second thin film stack.

11. The electromechanical device of claim 10, wherein said support structures comprise glass spheres.

12. The electromechanical device of claim 1, wherein the MEMS device comprises at least one area wherein a portion of the second film stack is independently movable towards the first film stack.

13. The electromechanical device of claim 1, wherein the transmission of light is a first substantially uniform percentage across visible wavelengths when the second film stack is in said first position, and wherein the transmission of light is a second substantially uniform percentage across visible wavelengths when the second film stack is in said second position, said first percentage being different than said second percentage.

14. The electromechanical device of claim 1, wherein the electromechanical device comprises a second substrate extending substantially parallel to the first substrate on which the first film stack is disposed, wherein the second substrate comprises an additional fixed thin film stack disposed thereon.

15. The electromechanical device of claim 14, wherein the fixed thin film stack is configured to reflect a substantial portion of incident infrared light.

16. The electromechanical device of claim 15, wherein the thickness of the gap between the first and second thin film stacks is less than about 15 nm when the second film stack is in the second position.

17. The electromechanical device of claim 1, wherein the thickness of the gap between the first and second thin film stacks is about 170 nm when the second film stack is in the first position.

18. An electromechanical device comprising:
a first film stack disposed upon a substrate, wherein the first film stack comprises a conductive layer and alternating sublayers of silicon oxide and titanium dioxide; and
a second film stack spaced apart from the first film stack by an air gap, wherein the second film stack comprises a conductive layer and alternating layers of silicon oxide and titanium dioxide, wherein the silicon dioxide sublayers in the first and second film stacks are about 20 nm in thickness and the titanium dioxide sublayers in the first and second film stacks are about 55 nm in thickness, and wherein the second film stack is movable between a first position and a second position so as to alter the transmission of a wide range of visible and infrared wavelengths;
wherein the electromechanical device transmits substantially more visible light and infrared light when in said first position than is transmitted in said second position.

19. The electromechanical device of claim 15, wherein the electromechanical device transmits greater than about 80% of incident infrared light when in said first position and transmits less than about 55% of incident infrared light when in said second position.

20. The electromechanical device of claim 18, wherein the electromechanical device functions as a partially reflective broad band mirror which reflects roughly 20% of incident visible and infrared light when in said first position and reflects roughly 50% of incident visible and infrared light when in said second position.

21. The electromechanical device of claim 18, wherein the air gap is about between the first and second film stacks is about 180 nm when the device is in an unactuated position.

22. An electromechanical device comprising:
a first film stack disposed upon a substrate, wherein the first film stack comprises a layer of ITO;
a second film stack spaced apart from the first film stack by an air gap, wherein the second film stack is movable between a first position and a second position, and wherein the second film stack comprises a layer of ITO overlying a layer of titanium dioxide; and
a plurality of intermediate layers disposed between the first film stack and the second film stack, wherein the plurality of intermediate layers comprises a plurality of titanium dioxide layers;
wherein the electromechanical device transmits substantially more visible light and infrared light when in said first position than is transmitted in said second position.

23. The electromechanical device of claim 22, wherein the plurality of titanium dioxide layers are about 52 nm in thickness.

24. The electromechanical device of claim 22, wherein the layers of ITO are about 20 nm in thickness.

* * * * *